US011531780B2

(12) United States Patent
Kundu et al.

(10) Patent No.: US 11,531,780 B2
(45) Date of Patent: Dec. 20, 2022

(54) DEEP LEARNING-BASED IDENTITY FRAUD DETECTION

(71) Applicant: International Business Machines Corporation, Armonk, NY (US)

(72) Inventors: Ashish Kundu, Elmsford, NY (US); Arjun Natarajan, Old Tappan, NJ (US); Kapil Kumar Singh, Cary, NC (US); Joshua F. Payne, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 16/413,138

(22) Filed: May 15, 2019

(65) Prior Publication Data

US 2020/0364366 A1 Nov. 19, 2020

(51) Int. Cl.
*G06F 21/62* (2013.01)
*G06F 21/57* (2013.01)
*G06Q 50/26* (2012.01)
*G06N 3/04* (2006.01)

(52) U.S. Cl.
CPC .......... *G06F 21/6245* (2013.01); *G06F 21/57* (2013.01); *G06N 3/04* (2013.01); *G06Q 50/265* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 5,819,226 A | 10/1998 | Gopinathan | |
| 6,163,604 A * | 12/2000 | Baulier | H04W 12/126 379/189 |
| 7,458,508 B1 * | 12/2008 | Shao | G06Q 20/04 235/380 |
| 7,686,214 B1 | 3/2010 | Shao et al. | |
| 7,793,835 B1 | 9/2010 | Coggeshall et al. | |
| 10,715,533 B2 * | 7/2020 | Iwanir | H04L 63/1416 |
| 11,177,937 B1 * | 11/2021 | McCown | H04L 9/50 |
| 2002/0099649 A1 | 7/2002 | Lee et al. | |
| 2004/0225520 A1 | 11/2004 | Aoki et al. | |
| 2013/0124176 A1 | 5/2013 | Fox et al. | |
| 2016/0092557 A1 * | 3/2016 | Stojanovic | G06F 16/254 707/723 |
| 2017/0344702 A1 * | 11/2017 | Shah | G16H 10/60 |
| 2019/0311367 A1 * | 10/2019 | Reddy | G06Q 20/4016 |

OTHER PUBLICATIONS

P. Mell et al., "The NIST Definition of Cloud Computing", National Institute of Standards and Technology, Information Technology Laboratory, Sep. 2011, pp. 1-7.
F. Scarselli et al., "The Graph Neural Network Model", 2009, IEEE Transations on Neural Networks, vol. 20, No. 1, pp. 61-80.

(Continued)

*Primary Examiner* — Olugbenga O Idowu
(74) *Attorney, Agent, or Firm* — Stephen R. Yoder

(57) ABSTRACT

A method provides a security action based on identity profile scores. One or more processors represent an identity profile as a knowledge graph. The processor(s) associate a set of changes of the identity profile across a plurality of identity networks with a fraud score. The processor(s) then implement a security action based on the fraud score.

20 Claims, 22 Drawing Sheets

(56) References Cited

OTHER PUBLICATIONS

M. Defferrard et al., "Convolutional Neural Networks on Graphs With Fast Localized Spectral Filtering", 2016, 30th Conference on Neural Information Processing Systems (NIPS 2016), Barcelona, Spain, pp. 1-9.
Q. Xu et al., "Collective Vertex Classification Using Recursive Neural Network", ARXIV:1701.06751V1, Jan. 24, 2017, pp. 1-7.
Q. Xu et al., "Attentive Graph-Based Recursive Neural Network for Collective Vertex Classification", ACM, 2017, CIKM'17, pp. 1-4.
B. Perozzi et al., "Deepwalk: Online Learning of Social Representations", ARXIV:1403.6652V2, Jun. 27, 2014, KDD'14, pp. 1-10.
H. Chen et al., "HARP: Hierarchical Representation Learning for Networks", AAAI, the Thirty-Second Aaai Conference on Artificial Intelligence, 2018, pp. 2127-2134.
A. Grover et al., "NODE2VEC: Scalable Feature Learning for Networks", ACM, KDD'16, 2016, pp. 1-10.
R. Wang et al., "Deep & Cross Network for Ad Click Predictions", ARXIV:1708.05123V1, Aug. 17, 2017, pp. 1-7.
R. Rossi et al., "Deep Feature Learning for Graphs", ARXIV:1704.08829V2, Oct. 16, 2017, pp. 1-11.
W. Hamilton et al., "Inductive Representation Learning on Large Graphs", 31st Conference on Neural Information Processing Systems (NIPS 2017), Long Beach, CA, USA, 2017, pp. 1-19.
J. Leskovec et al., "SNAP: Stanford Large Network Dataset Collection", http://snap.stanford.edu/data/index.html, Retrieved May 10, 2019, pp. 1-5.
S. Hochreiter et al., "Long Short-Term Memory", Neural Computation 9(8): 1735-1780, 1997.
S. Bai et al., "An Empirical Evaluation of Generic Convolutional and Recurrent Networks for Sequence Modeling", ARXIV:1803.01271V2, Apr. 19, 2018, pp. 1-14.
Y. Kou et al., "Survey of Fraud Detection Techniques", IEEE, Proceedings of the 2004 IEEE International Conference on Networking, Sensing & Control, Taipei, Taiwan, 2004, pp. 740-754.
D. West, "Neural Network Credit Scoring Models", www.sciencedirect.com, Computers & Operations Research, vol. 27, Issues 11-12, Sep. 2000, pp. 1131-1152 (Abstract Only).
IBM, "Create a Seamless Experience for Customers Throughout Their Digital Journey", IBM Security Solution Brief, 2018, pp. 1-6.
S. D'Alfonso, "Synthetic Identity Theft: Three Ways Synthetic Identities are Created", www.securityintelligence.com, Oct. 28, 2014, pp. 1-4.
S. D'Alfonso, "IBM Red Cell Research: Vehicle Buy-and-Ship Fraud Schemes Use Synthetic Identities", www.securityintelligence.com, Feb. 26, 2016, pp. 1-3.

* cited by examiner

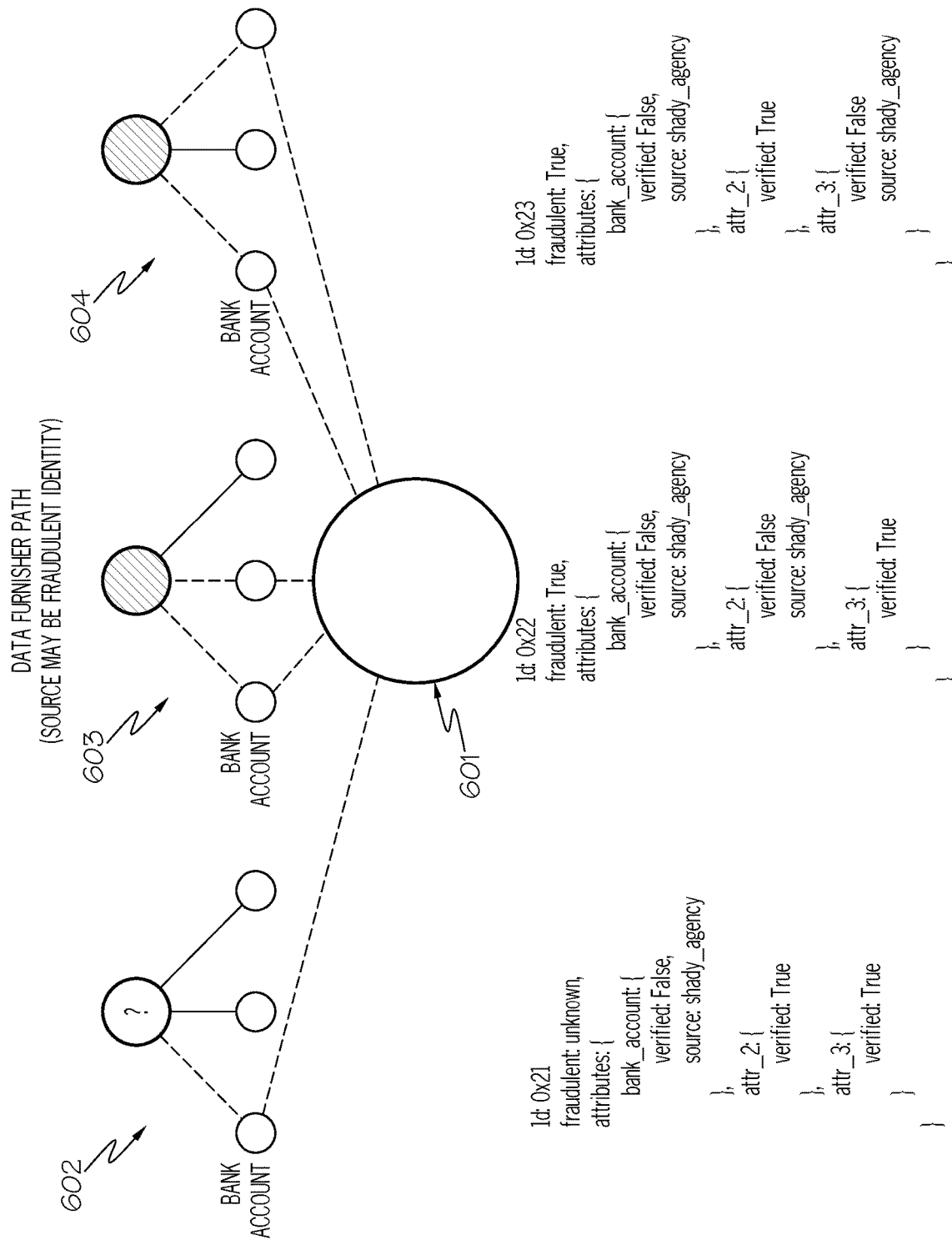

DEEP LEARNING-BASED IDENTITY FRAUD DETECTION

BACKGROUND

The present invention relates to the field of identity fraud detection, and specifically to identifying fraudulent identities in one or more identity networks. More specifically, the present invention relates to providing a security action based on the identified fraudulent identities.

SUMMARY

In an embodiment of the present invention, a method provides a security action based on identity profile scores. One or more processors represent an identity profile as a knowledge graph. The processor(s) associate a set of changes of the identity profile across a plurality of identity networks with a fraud score. The processor(s) then implement a security action based on the fraud score.

In one or more embodiments, the method(s) described herein are performed by an execution of a computer program product and/or a computer system.

BRIEF DESCRIPTION OF THE DRAWINGS

FIGS. 6A-6B illustrates identity profile graphs of fraudulent identities that have been generated using other fraudulent entities and/or legitimate entity sources that have been improperly usurped in accordance with one or more embodiments of the present invention;

DETAILED DESCRIPTION

Figure 1:
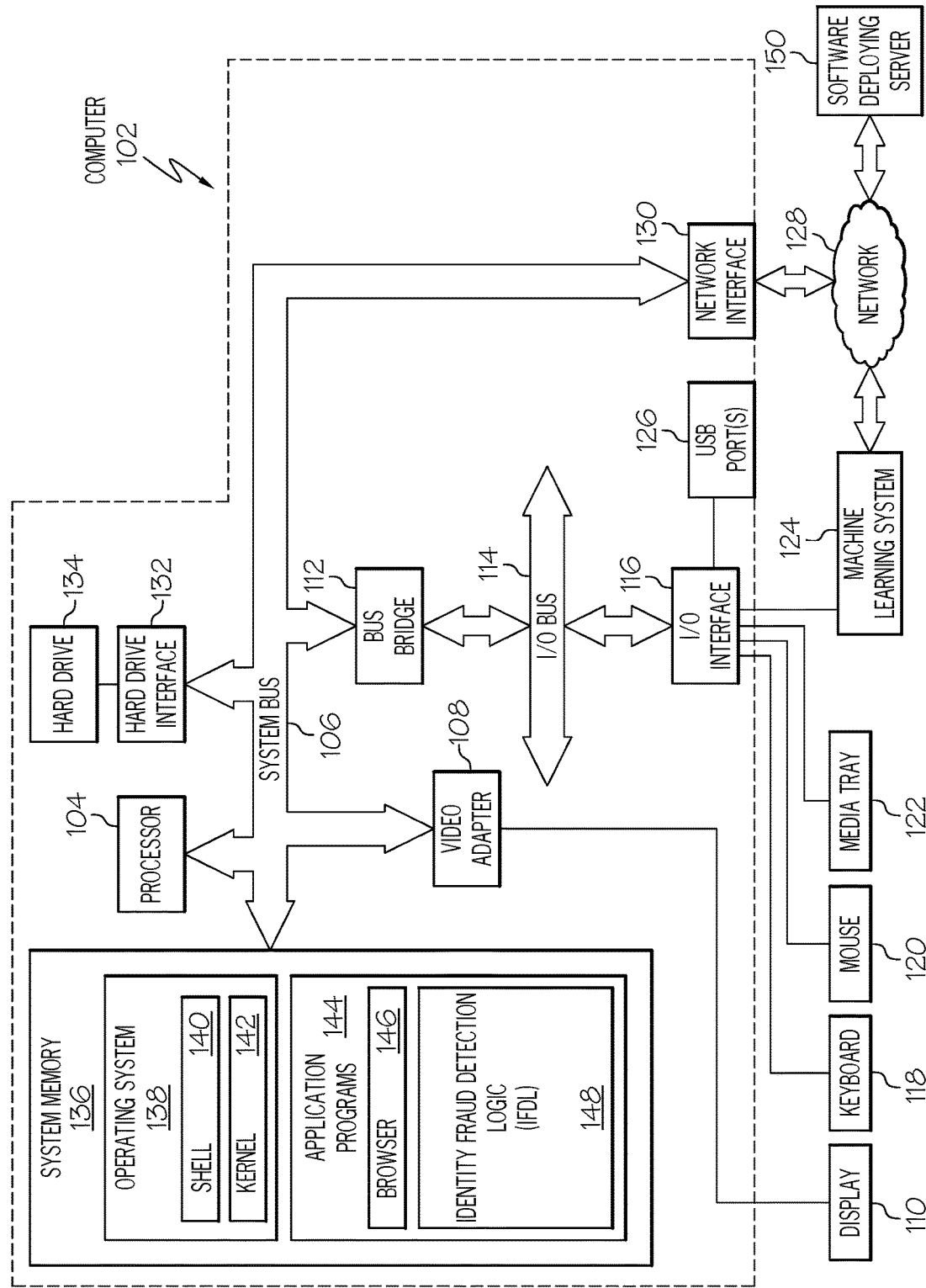
FIG. 1 depicts an exemplary system and network in which the present invention is implemented in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function (s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that is utilized by and/or implemented in one or more embodiments of the present invention. Note that some or all of the exemplary architecture, including both depicted hardware and software, shown for and within computer 102 may be utilized by software deploying server 150 and/or machine learning system 124 shown in FIG. 1, identity broker 218 and/or identity requester 220 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a machine learning system 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the machine learning system 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file.

Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Identity Fraud Detection Logic (IFDL) 148. IFDL 148 includes code for implementing the processes described below, including those described in FIGS. 2-14. In one embodiment, computer 102 is able to download IFDL 148 from software deploying server 150, including in an on-demand basis, wherein the code in IFDL 148 is not downloaded until needed for execution. Note further that, in one embodiment of the present invention, software deploying server 150 performs all of the functions associated with the present invention (including execution of IFDL 148), thus freeing computer 102 from having to use its own internal computing resources to execute IFDL 148.

Also connected to (or alternatively, as part of) computer 102 is a machine learning system 124. In exemplary embodiments of the present invention, machine learning system 124 is a graph neural network (see FIGS. 8-9) a deep neural network (see FIG. 10), another type of heuristic artificial intelligence, and/or a combination thereof.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention. For example, and with specific regard to a server as used in one or more embodiments of the present invention, computer 102 is lacking elements such as irrelevant components such as video adapter 108, keyboard 118, etc., but includes elements (not shown) such as graphics processing units, co-processors for various functions (e.g., dedicated to certain arithmetic processes), etc.

As used herein, an identity is defined as a record that includes identification information about a particular entity. An exemplary entity is a person, although the present invention is also applicable for providing an identity of a device, a software program, etc. The terms "identity", "identity profile", "identity file" and "identity record" are used interchangeably herein to denote an "identity".

Identity fraud is committed in the context of identity profiles when false information is included in an identity profile. Such false information can be based on various factors, including but not limited to the following.

Attributes of an identity profile for a particular entity can be false. For example, if the identity profile includes an entry stating that this particular entity has a college degree, when in fact he/she does not, then that attribute is false.

Values of an attribute of an identity profile for a particular entity can be false. Assume that the particular entity in fact has a college degree. However, if his/her grade point average was 2.5 on a scale of 0-4, but the attribute value states that his/her grade point average was 3.9, then this value of the attribute is false.

Legitimate identity profiles can be misused to create a false identity profiles. For example, a person can improperly claim features from another person's identity (e.g., a driver's license number) as his/her own. Thereafter, credit scores, wage histories, etc. of the other person can be assigned to the false identity profile.

Identity fraud is on the rise in the digitized world. However, patterns of identify fraud are changing, particularly since fraudsters have access to more resources, social networks, and stolen identities, and thus are able to use multiple identities.

As described herein, various types of fraudulent identity profiles contain fraudulent data. That is, attributes/assets themselves can be fraudulent and/or values of otherwise legitimate attributes/assets are fraudulent, and/or authentic attributes/assets may be leveraged to get fraudulent attributes/assets "verified". For example, an authentic identity profile can be stolen, such that it is used by a malicious actor in order to acquire credit, make a purchase, etc.

Currently, identity networks do not share identity data amongst themselves for the purpose of discovering correlations and patterns linked to fraud. Furthermore, identity networks do not share fraud scores (i.e., a rating of how reliable/trustworthy an identity record is for a particular person) amongst themselves.

Figure 2:
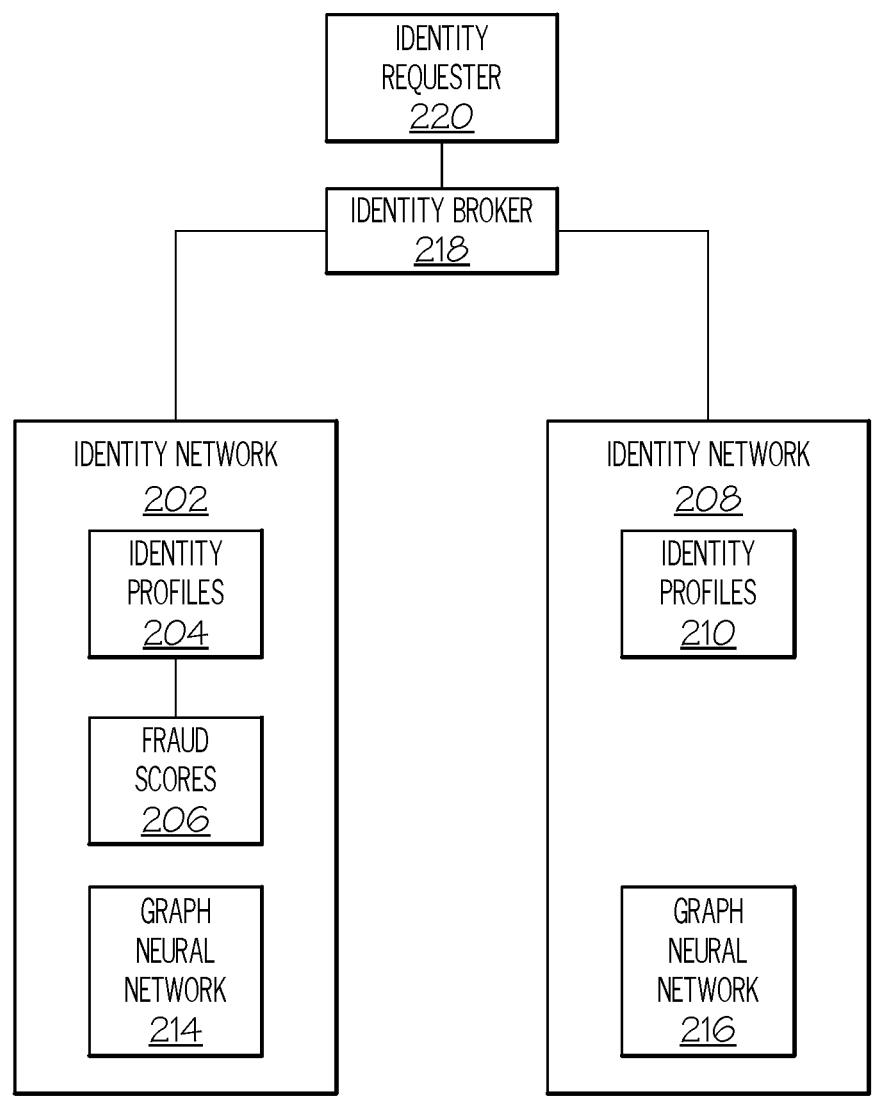
FIG. 2 illustrates a high-level overview of an identity broker coupled to multiple identity networks in accordance with one or more embodiments of the present invention.

For example, consider FIG. 2, which depicts two identity networks. Identity networks are networks that contain and/or provide identity profiles. For example, identity network 202 could be a network for a bank, which contains identity profiles 204 that contain profile information about its customers (e.g., name, address, bank account number, social security number, etc.). Assume that the identity network 202 has also determined how trustworthy the profiles in the identity profiles 204 are, and stores fraud scores 206 that are associated with one or more of the identity profiles 204. For example, assume that identity network 202 was recently the victim of a cyberattack. As such, all of the identities from the identity profiles 204 could now be suspect/untrustworthy for accurately describing particular persons/entities, and thus the fraud scores 206 are low (in which a low fraud score is indicative of fraud while a high fraud score is indicative of trustworthiness).

Furthermore, the fraud scores 206 can vary for each of the identity profiles 204. For example, if a particular identity profile from the identity profiles 204 is for a 20-year customer of the bank and there have been no reports of cyberattacks on the identity network 202, then the fraud score for that particular identity profile will be high. However, if another identity profile from the identity profiles 204 is for a new customer whose application information has inaccurate information (e.g., a false social security number, etc.), then the fraud score for that new customer is low.

Figure 8:
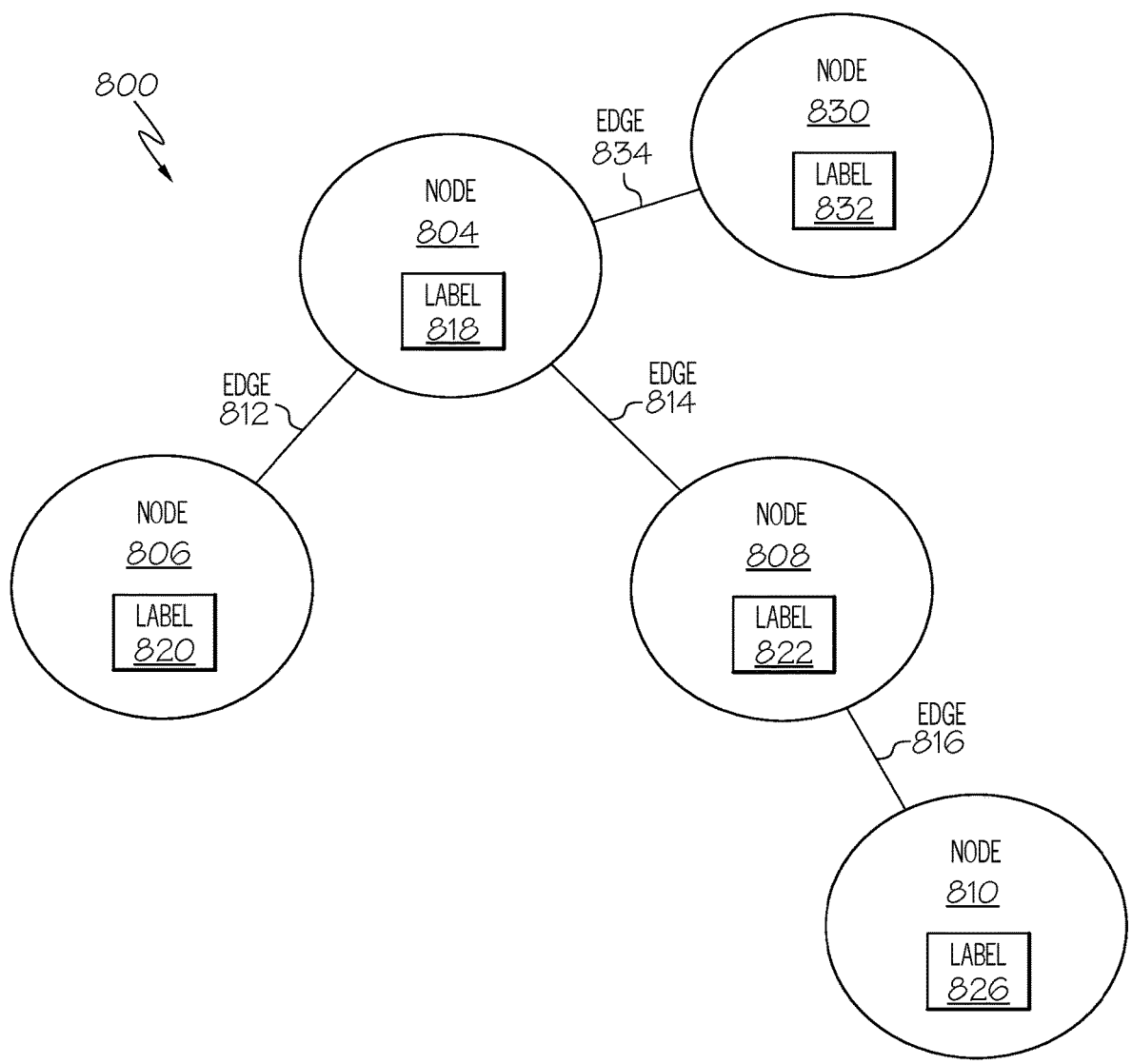
FIG. 8 illustrates an exemplary graph neural network (GNN) as utilized in one or more embodiments of the present invention.
Figure 9:
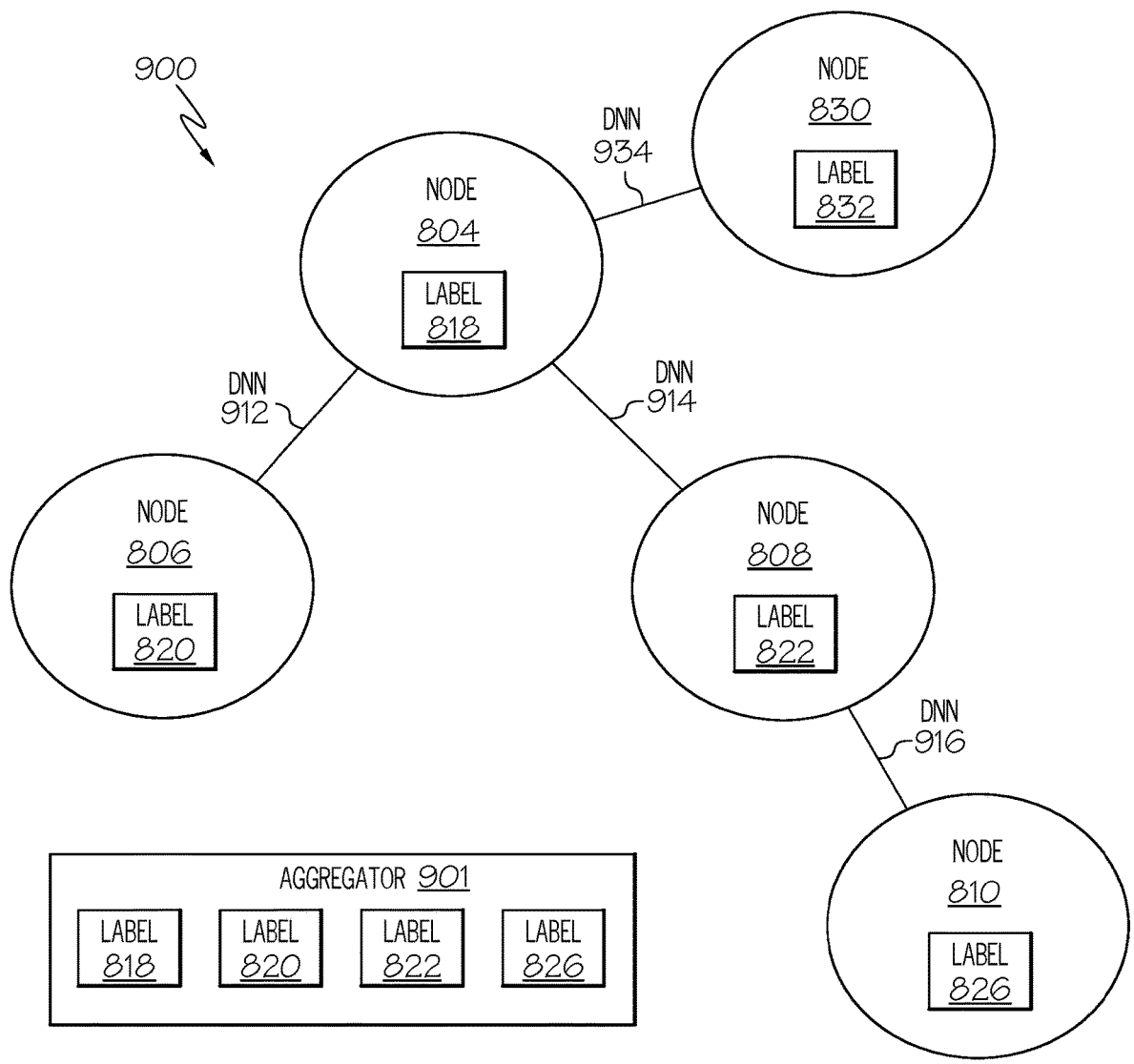
FIG. 9 depicts a GNN that utilizes deep neural networks (DNNs) as edges in one or more embodiments of the present invention.

As described herein, each identity profile for each person whose identity record/profile is within a particular identity network has an associated graph neural network (see FIGS. 8-9). That is assume that Person A has an identity profile in both identity network 202 as well as identity network 208. Assume further that a graph neural network for each of these identity profiles has a same structure, but perhaps with different labels and/or attribute values. That is, graph neural network 214 and graph neural network 216 are both for Person A, and they both have a same nodal structure. If the aggregate label values (see below with reference to aggregator 901 in FIG. 9) for graph neural network 214 and graph neural network 216 are different, even though they have the same structure and are supposed to both be for the same Person A, then one or both of these identity records/profiles for Person A are deemed to be fraudulent.

In an embodiment of the present invention, an identity broker 218 receives requests from identity requesters 220, which are fulfilled by the identity broker 218 from identity profiles from various identity networks (e.g., identity network 202 and identity network 208) and the analysis thereof, as described herein.

One example of identity profile fraudulent use is based on behavior fraud. For example, assume that Person A is an identity of a fraudster, Person B is the identity a minor. A government agency network has Person B's social security number information over time (and reports inactivity for the past 10 years). Person A steals Person B's social security number, and notes that it is easy to verify fake information with Credit Agency C in a credit agency network. Person A applies for credit with this social security number through Credit Agency C, and Credit Agency C then grants Person A credit. Person A then commits fraud and abandons the identity.

Another example of fraudulent identity profiles is based on a fraud path. For example, assume that Person A is an identity of a fraudster, Person B is the identity of a "pollinator" (i.e., a party who, informed or not, is adding Person A to his/her credit card account, bank account, etc.). Assume further that a credit agency network has data about nodes adjacent to Person B's credit score who have inherited the score. A such, Person A piggybacks on Person B's credit, inheriting his/her score. Thereafter, Person A applies for a loan from Loan Company C in a connected loan company network. Loan Company C only sees the credit score for Person B, and grants a loan to Person A, who then defaults on the loan.

With reference now to FIGS. 3A-7E, nodal descriptions of various types of identity fraud are depicted.

Figure 3A:
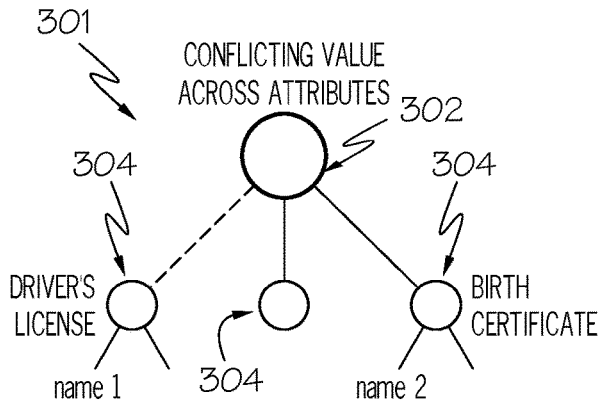
FIGS. 3A-3C depicts identity profile graphs of fraudulent identities indicated by conflicting values across attributes, invalid attribute values, and/or inconsistent value logic across attributes in accordance with one or more embodiments of the present invention.
Figure 3B:
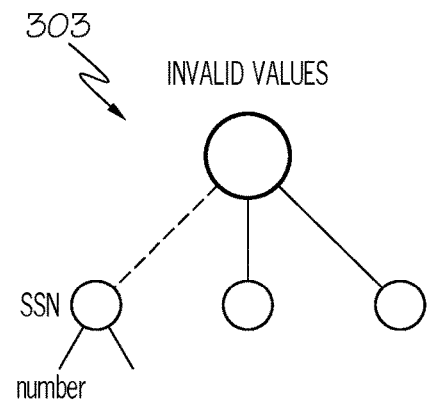
Figure 3C:
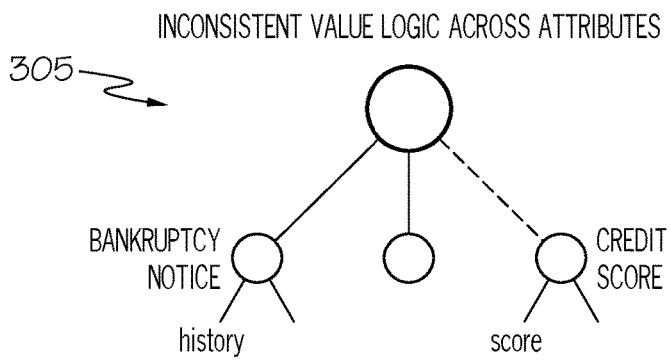

As shown in FIGS. 3A-3C, identity fraud can be based on the values found for attributes in an identity profile. That is, each identity profile is composed of one or more nodes, which contain information about a particular entity/person. If this information is wrong, then the identity profile is untrustworthy and/or fraudulent.

Exemplary identity profile graph 301 includes a name node 302 (i.e., the name of the person whose identity is being represented by the identity profile graph 301), and one or more attribute nodes 304, which contain(s) values of various attributes (profile, history, etc.) of that person.

Thus, as shown in identity profile graph 301, there can be conflicting values across attributes for an identity profile. For example, if a same person presents driver's licenses issued by two different states, but they have different names, then either the person has legally changed his/her name (e.g., after getting married), or else the identity record is fraudulent. Additional research is then performed to determine why the names on the two driver's licenses are different.

In identity profile graph 303, the information is prima facie (on its face) false. For example, a social security number that has 10 digits must be false, since social security numbers only have 9 digits in the United States.

In identity profile graph 305, data in two or more nodes in the identity profile are contradictory. For example, assume that one of the nodes is for a bankruptcy history of a person, which indicates that the person has filed for bankruptcy during the past year. Another node in the same identity profile shows this person to have a credit score of 850, which is unlikely, if not impossible, for one who has recently filed for bankruptcy.

Figure 4A:
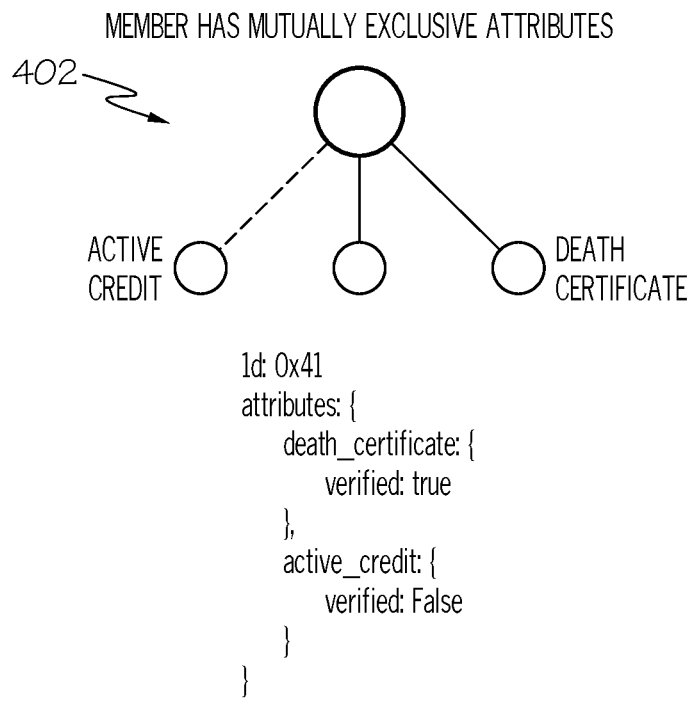
FIGS. 4A-4B illustrates identity profile graphs of fraudulent identities indicated by mutually exclusive attributes, missing attributes, and/or excessive quantities of a similar type of attribute in accordance with one or more embodiments of the present invention.
Figure 4B:
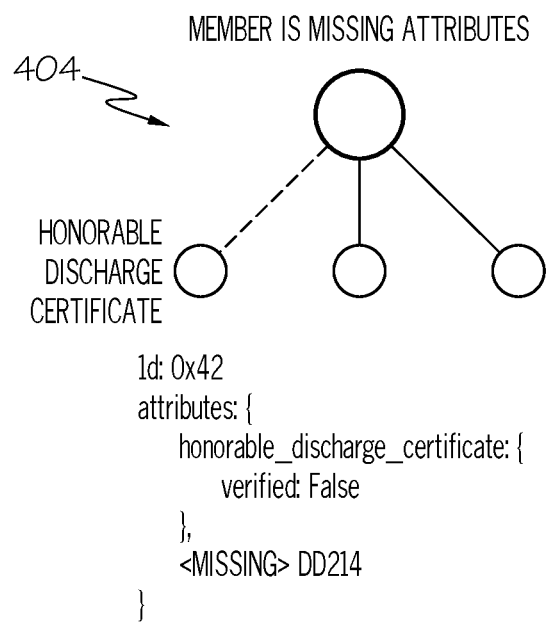

With reference now to FIGS. 4A-4B, another type of fraud recognition is based on attributes (rather than values, as described in FIGS. 3A-3C) of nodes in an identity profile graph. As shown in identity profile graph 402, two nodes are in conflict with one another. That is, one of the nodes shows that the person is still making purchases with his/her credit card, while another node shows a death certificate for that person. This suggests that the identity of the person using that credit card is fraudulent.

In identity profile graph 404, there is a missing attribute that is required to support another attribute. For example, assume that a "complete" military record of a person shows that he/she has an honorable discharge from the military. However, this military record does not include a United States Department of the Defense form DD-214, which is a summary of that person's military service. As such, there is a question now as to whether the person ever served in the military, and thus whether this identity profile 404 is accurate or fraudulent.

Figure 5A:
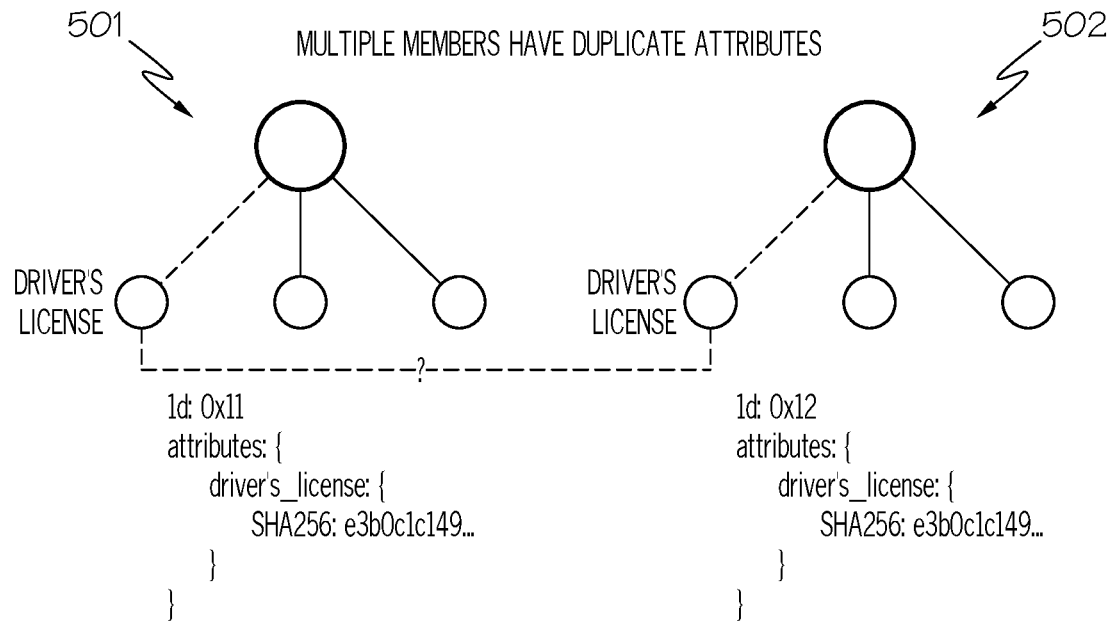
FIGS. 5A-5C depicts identity profile graphs of fraudulent identities indicated by multiple members having duplicate attributes, unverified attributes, and/or multiple entities being very similar in accordance with one or more embodiments of the present invention.
Figure 5B:
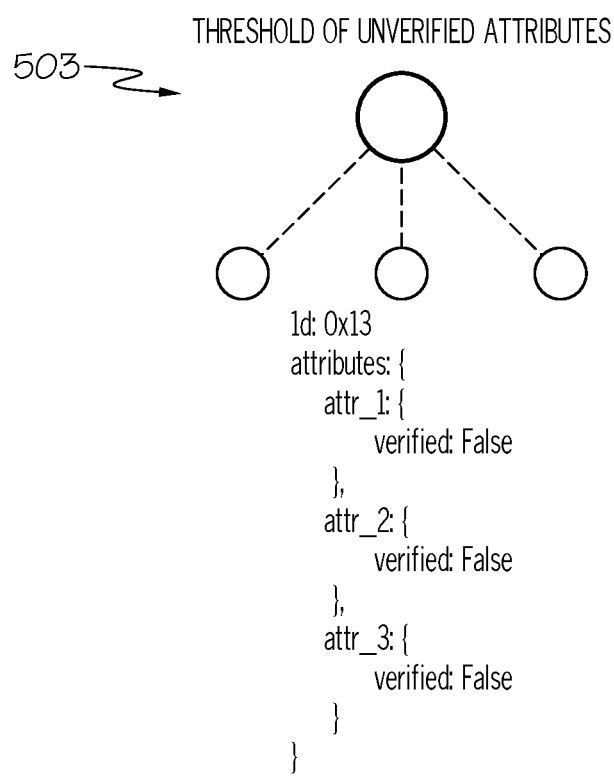
Figure 5C:
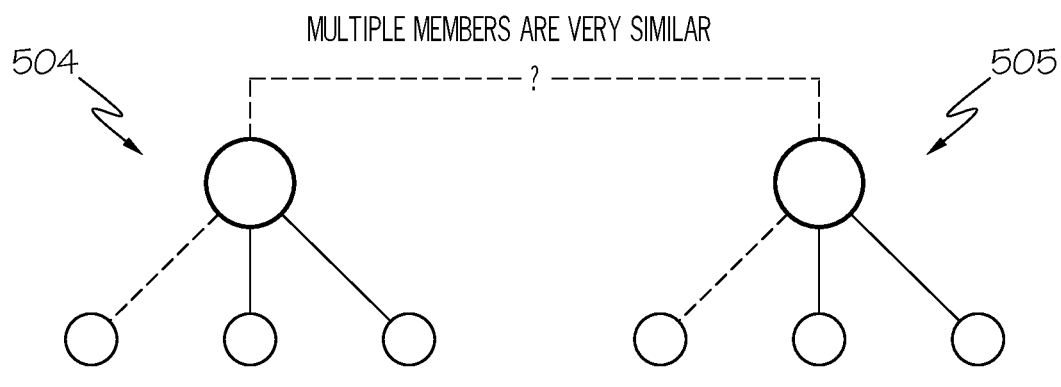

With reference to FIGS. 5A-5C, other types of fraud detection use edge information. Edges between nodes in profile graphs describe relationships between the nodes. For example, identity profile graph 501 and identity profile graph 502 both have an edge that goes to a node having a same value (e.g., a same driver's license number). As such, one or both of identity profile graph 501 and identity profile graph 502 are deemed to be potentially fraudulent.

As shown in identity profile graph 503, some or all of the attributes are unverified (false), and thus the identity profile is deemed to be fraudulent.

As shown in identity profile graph 504 and identity profile graph 505, if two identity profiles are too similar, then one or both are deemed to be fraudulent. That is, even if the attributes/attribute values are not conflicting on their face (e.g., having a same social security number), it is highly unlikely that two persons would have the same address, the same date of birth, spouses that have the same name, etc. As such, one or both of identity profile graph 504 and identity profile graph 505 are deemed to be potentially fraudulent.

Figure 6B:
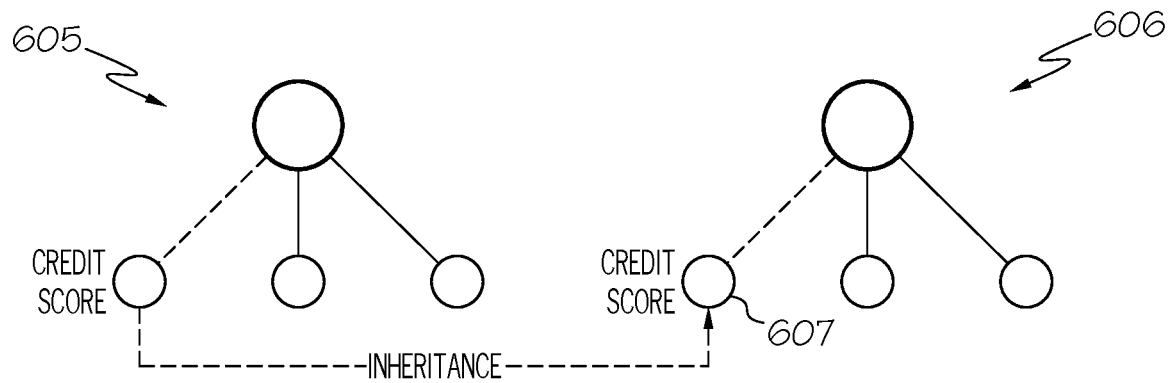

With reference now to FIGS. 6A-6B, fraud can be indicated by paths from a data furnisher and/or a pollinator.

Assume that a data furnisher such as a credit reporting agency, represented by node 601, provides identity data for bank account holders shown in identity profile graph 602, identity profile graph 603, and identity profile graph 604. However, as indicated by the dashed lines coming from node 601, one or more of the attribute values are not verified. As such, information coming from that credit reporting agency is suspect, and so are the identities associated with the identities profile graphs 602-604.

As shown in identity profile graph 605, a person ("Person A") has a valid identity profile that has been verified. However, another person ("Person B") has an attribute node 607 (in his/her identity profile graph 606) that inherits the credit score of the person whose identity is represented by identity profile graph 605. That is, Person B is being allowed to use the credit card, bank account, etc. of Person A, but Person B is not permitted to use the credit score of Person A. As such, the identity attributes of Person B are deemed to be fraudulent.

With reference to FIGS. 7A-7E, other types of fraud are detected by temporal behaviors.

For example, consider identity profile graph 701 and identity profile graph 702. At time $t_1$, an attribute (e.g., a particular driver's license number) is owned by the person (Person A) represented by identity profile graph 701, while at a later time ($t_2$) that same driver's license number is part of the identity profile graph 702 for another person (Person B). Since two persons cannot have the same driver's license number within a certain period of time (e.g., with a year of one another), then the identity profiles (and their respective identity profile graphs) of Person A and/or Person B are deemed to be fraudulent.

Consider now the identity profile graph 703, in which an attribute changes over times $t_1$-$t_3$ in a suspicious manner. That is, if the identity profile graph 703 is for a same person over times $t_1$-$t_3$, but an attribute (e.g., a name on that same person's passport), which should remain somewhat constant, repeatedly changes over times $t_1$-$t_3$, then the identity profile graph 703 is likely fraudulent.

Consider now identity profile graph 704, if attributes are added and removed in a volatile and/or abnormal manner, then the identity represented by identity profile graph 704 is likely fraudulent. For example, assume that at time $t_1$, no attributes are assigned to the base node (e.g., the person's name) 705 of the identity profile graph 704. However, at time $t_2$, the identity profile graph 704 has three unverified attributes (e.g., indicating an education level, a job description, an annual salary), but at time $t_3$, these attributes are removed. This indicates that the attributes are being added in a volatile manner using data from an untrusted source.

Thus, as shown in pattern 706, some combination of the temporal behaviors (i.e., time-base of values fraud shown in FIGS. 3A-3C, time-base of attribute fraud shown in FIGS. 4A-5C, and/or time-base of path fraud shown in FIGS. 6A-6B) is used to identify identity fraud.

With reference now to FIG. 8, addition detail of the identity profile graphs depicted in FIGS. 3A-7E is shown in an embodiment of the present invention as a graph neural network 800.

Graph neural network 800 is a collection of nodes, each of which have a label, that are connected by edges.

For example, assume that node 804 includes the label 818 of "Name". Node 806, node 808, and node 810 are attributes of the entity identified by label 818. For example, node 806 could be for the attribute "occupation", and could have the label 820 of "teacher". Edge 812 includes a description of node 806 and its relationship to node 804. Node 808, logically connected by edge 814 to node 804, could be for the attribute "street address", and could have the label 822 of "123 Main Street". Node 810, logically connected to node 808 by edge 816, could be for the attribute "city address", and could have the label 826 of "Anywhere, USA".

As stated in the description of graph neural network 800, the edges 812, 814, 816 provide a logical relationship between their respective nodes. As such, the connections provided by edges 812, 814, 816 create the neural network.

In an embodiment of the present invention, the graph neural network 800 includes a verifier node 830, which verifies that the information in the graph neural network 800 came from a certain provider. For example, assume that graph neural network 800 is for Person A. The verifier node 830 includes a label 832, which identifies "Company X" as the source of identity information about Person A. In an embodiment of the present invention, however, the validity/accuracy of the attributes and their labels/values is not guaranteed. Rather, the verifier node 830 merely verifies that the attributes and their labels/values are provided by Company X. Whether or not the information in the attributes/nodes/labels has been verified is described in edge 834. As shown in FIG. 9, if edge 834 is actually a deep neural network 934, then this deep neural network 934 is trained to determine if the attributes/nodes/labels are accurate, and to reports their accuracy/trustworthiness to the node 804/904.

In the related graph neural network 900 shown in FIG. 9, the logical relationship provided by edges 812, 814, 816 in the graph neural network 800 is established by neural networks. That is, the nodes 804, 806, 808, and 810 and the labels 818, 820, 822, and 826 remain the same, but edges 812, 814, 816 are deep neural networks 912, 914, 916.

More specifically, the logical relationships between the nodes in the graph neural network 900 are established by deep neural networks.

Figure 10:
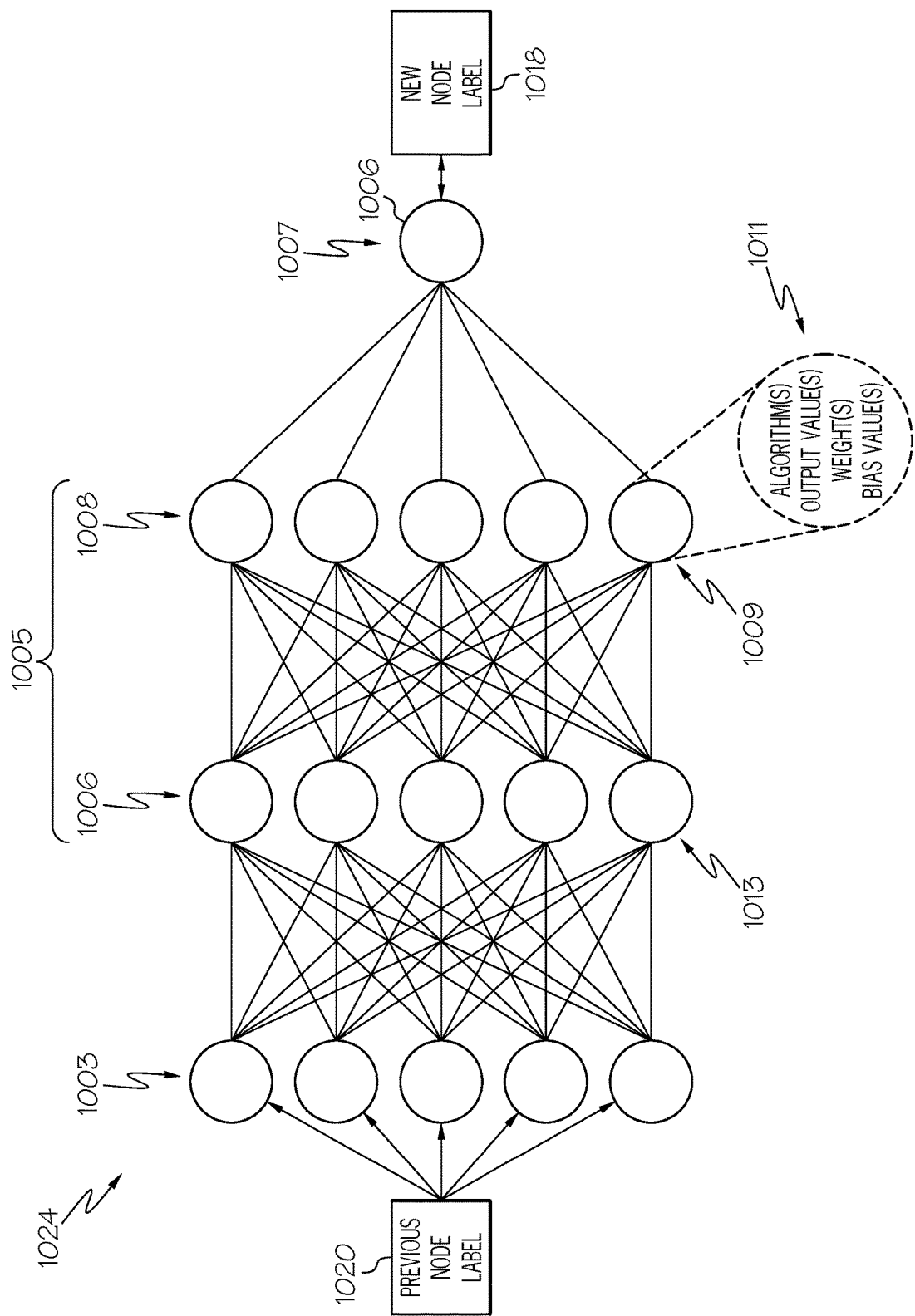
FIG. 10 illustrates an exemplary DNN as used in one or more embodiments of the present invention.

For example, consider deep neural network 1024 (analogous to machine learning system 124 shown in FIG. 1 and/or deep neural network (DNN) 912 shown in FIG. 9), as depicted in FIG. 10.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a Deep Neural Network (DNN), electronic neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

With reference now to FIG. 10, a Deep Neural Network (DNN) 1024 (analogous to machine learning system 124 shown in FIG. 1 and/or DNN 912, DNN 914, and/or DNN 916 shown in FIG. 9) used to evaluate data in one or more embodiments of the present invention is presented. As described herein, DNN 1024 is able to discern the logical relationships between nodes in a graph neural network, such as graph neural network 900 shown in FIG. 9.

For example, assume that label 820 includes a suffix that suggests a label for an occupation of the person named in node 804 in FIG. 9. That is, a suffix in label 820 of "er" (e.g., "teacher" or "engineer"), "ist" (e.g., "physicist"), "ian" (e.g., "physician"), etc. is used by a trained deep neural network to recognize this label 820 as a name of an occupation, which thus defines the edge between node 804 and node 806 in FIG. 9.

As shown in FIG. 10, assume that previous node label 1020 (analogous to the content of label 820 in FIG. 9) is data that describes a particular occupation. Assume further that the DNN 1024 is trained to output a new node label 1018 (analogous to the content of label 818 in FIG. 9), thus indicating that there is a logical relationship (e.g., edge 812 shown in FIG. 8) between node 806 and node 804, in which node 806 describes an occupation of the person identified in node 804.

The electronic neurons (also referred to herein simply as "neurons" or "nodes") in DNN 1024 are arranged in layers, known as an input layer 1003, hidden layers 1005, and an output layer 1007. The input layer 1003 includes neurons/nodes that take input data, and send it to a series of hidden layers of neurons (e.g., hidden layers 1005), in which neurons from one layer in the hidden layers are interconnected with all neurons in a next layer in the hidden layers 1005. The final layer in the hidden layers 1005 then outputs a computational result to the output layer 1007, which is often a single node for holding vector information. In an embodiment of the present invention, the output neuron 1006 is associated with a particular node label from the graph neural network 900 shown in FIG. 9, such as label 818 in FIG. 9 (shown as new node label 1018 in FIG. 10).

As just mentioned, each node in the depicted DNN 1024 represents an electronic neuron, such as the depicted neuron 1009. As shown in block 1011, each neuron (including neuron 1009) functionally includes at least three features: a mathematical function, an output value, a weight, and a bias value.

The mathematical function is a mathematic formula for processing data from one or more upstream neurons. For example, assume that one or more of the neurons depicted in the middle hidden layers 1005 send data values to neuron 1009. Neuron 1009 then processes these data values by executing the mathematical function shown in block 1011, in order to create one or more output values, which are then sent to another neuron, such as another neuron within the hidden layers 1005 or a neuron in the output layer 1007. Each neuron also has a weight that is specific for that neuron and/or for other connected neurons. Furthermore, the output value(s) are added to bias value(s), which increase or decrease the output value, allowing the DNN 1024 to be further "fine-tuned".

For example, assume that neuron 1013 is sending the results of its analysis of a piece of data to neuron 1009. Neuron 1009 has a first weight that defines how important data coming specifically from neuron 1013 is. If the data is important, then data coming from neuron 1013 is weighted heavily, and/or increased by the bias value, thus causing the mathematical function (s) within neuron 1009 to generate a higher output, which will have a heavier impact on neurons in the output layer 1007. Similarly, if neuron 1013 has been determined to be significant to the operations of neuron 1009, then the weight in neuron 1013 will be increased, such that neuron 1009 receives a higher value for the output of the mathematical function in the neuron 1013. Alternatively, the output of neuron 1009 can be minimized by decreasing the weight and/or bias used to affect the output of neuron 1009. These weights/biases are adjustable for one, some, or all of the neurons in the DNN 1024, such that a reliable output will result from output layer 1007. In one or more embodiments of the present invention, finding the values of weights and bias values is done automatically by training the neural network. In one or more embodiments of the present invention, manual adjustments are applied to tune the hyperparameters such as a learning rate, dropout rate, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted, the weights are adjusted by the user, sensor logic, etc. in a repeated manner until the output from output layer 1007 matches expectations. For example, assume that input layer 1003 receives inputs that describe a particular graph neural network node/label. In an exemplary input, the input to input layer 1003 contains values that describe a certain occupation (e.g., "teacher"). If DNN 1024 has been properly trained (by adjusting the mathematical function (s), output value(s), weight(s), and biases in one or more of the electronic neurons within DNN 1024), then it will output a vector/value to output neuron 1006 in the output layer 1007, indicating that the output neuron 1006 is associated with the new node label 1018 for a name of a person.

When automatically adjusted, the weights (and/or mathematical function) are adjusted using "back propagation", in which weight values of the neurons are adjusted by using a "gradient descent" method that determines which direction each weight value should be adjusted to. This gradient descent process moves the weight in each neuron in a certain direction until the output from output layer 1007 improves (e.g., accurately describes the relationship between two nodes in the graph neural network 900 shown in FIG. 9).

Returning to FIG. 9, in an embodiment of the graph neural network 900, the labels are eventually aggregated by computing logic known as an aggregator. That is, labels from proximate nodes (e.g., label 818 from node 804, label 820 from node 806, and label 822 from node 808) are aggregated using an aggregator 901, which is logic that identifies and aggregates labels. Thereafter, a second order aggregation occurs, which brings label 826 into the aggregation of labels 818, 820, and 822. This aggregation of labels 818, 820, 822, and 826 is a summation or other mathematical description (e.g., average, mean, etc.) that provides an overall label for the graph neural network 900. For example, assume that the respective values for labels 818, 820, 822, and 826 are 8, 2, 4, and 2. As such, if a summation is used, then the aggregated value for labels 818, 820, 822, and 826 is 16 (8+2+4+2=16).

Thus, returning to FIG. 2, assume that graph neural network 214 has an aggregated value of 16, and that graph neural network 216 has an aggregated value of 20. This indicates that the identity profiles 204 and 210 (and their associated graph neural networks 214 and 216) are different, even though they purportedly were supposed to be for the identity of the same person.

Figure 11:
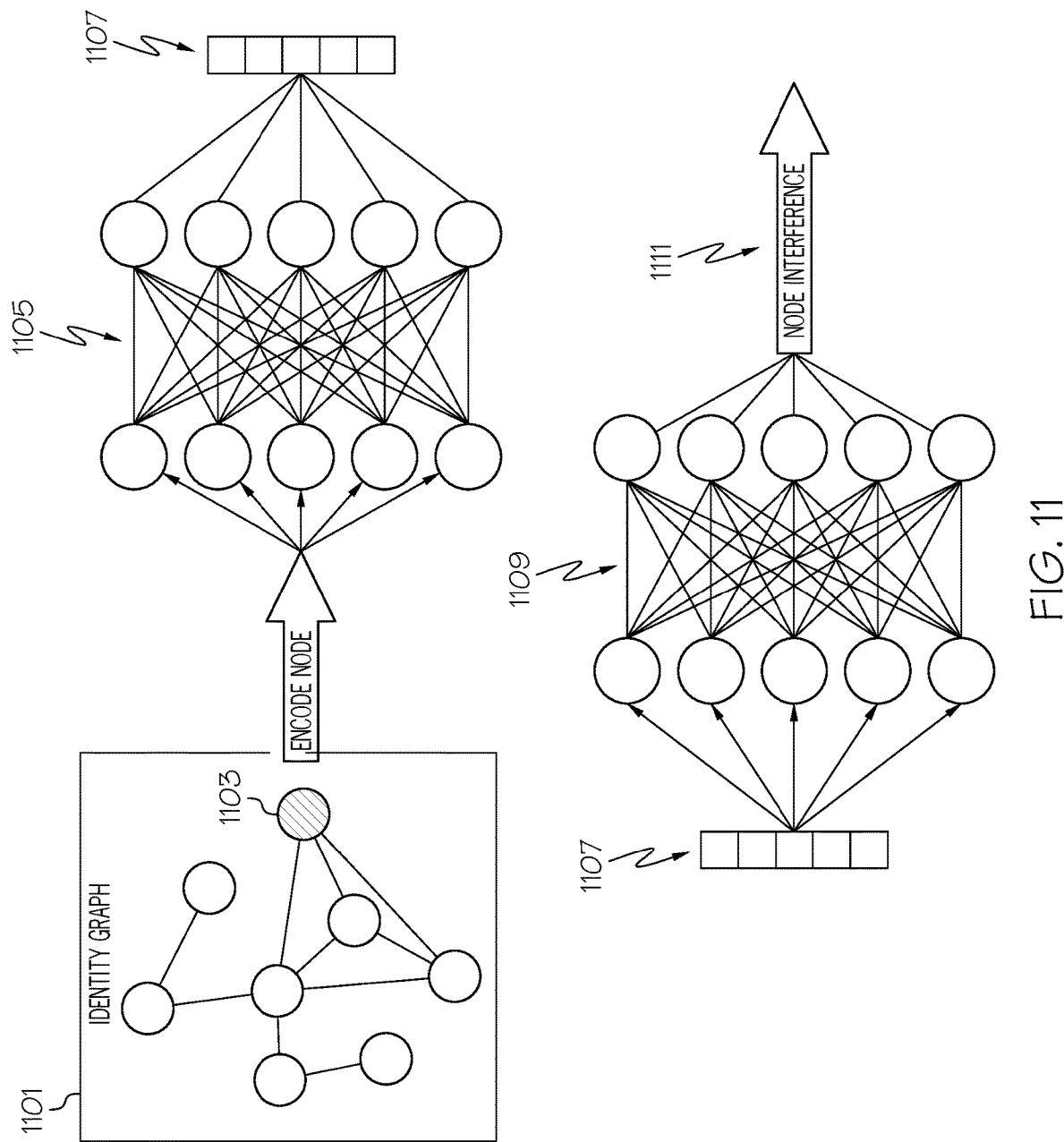
FIG. 11 depicts an exemplary graph neural network as utilized in one or more embodiments of the present invention.

With reference now to FIG. 11, another representation of an exemplary graph neural network 1105 as utilized in one or more embodiments of the present invention is presented.

As shown in identity graph 1101, a graph of an identity includes multiple nodes that describe attributes of the entity represented by the identity graph 1101. These nodes include node 1103, which includes multiple values describing one or more attributes of that entity. These attribute values are then entered into a neural network 1105 (analogous to DNN 1024 shown in FIG. 10), which outputs/embeds a vector into output vector 1107. The output vector 1107 is then entered into a neural network 1109 (which in an embodiment of the present invention is a same neural network as neural network 1105, while in another embodiment is a different neural network than neural network 1105), which then outputs a node inference 1111. Node inference 1111, which describes an inference as to whether node 1103 is fraudulent or not based on the evaluation performed by neural network 1105 and neural network 1109, is then provided to the identity broker 218 shown in FIG. 2, in order to enable the identity broker to determine whether the identity represented by the identity graph 1101 is or is not likely to be fraudulent.

Figure 12:
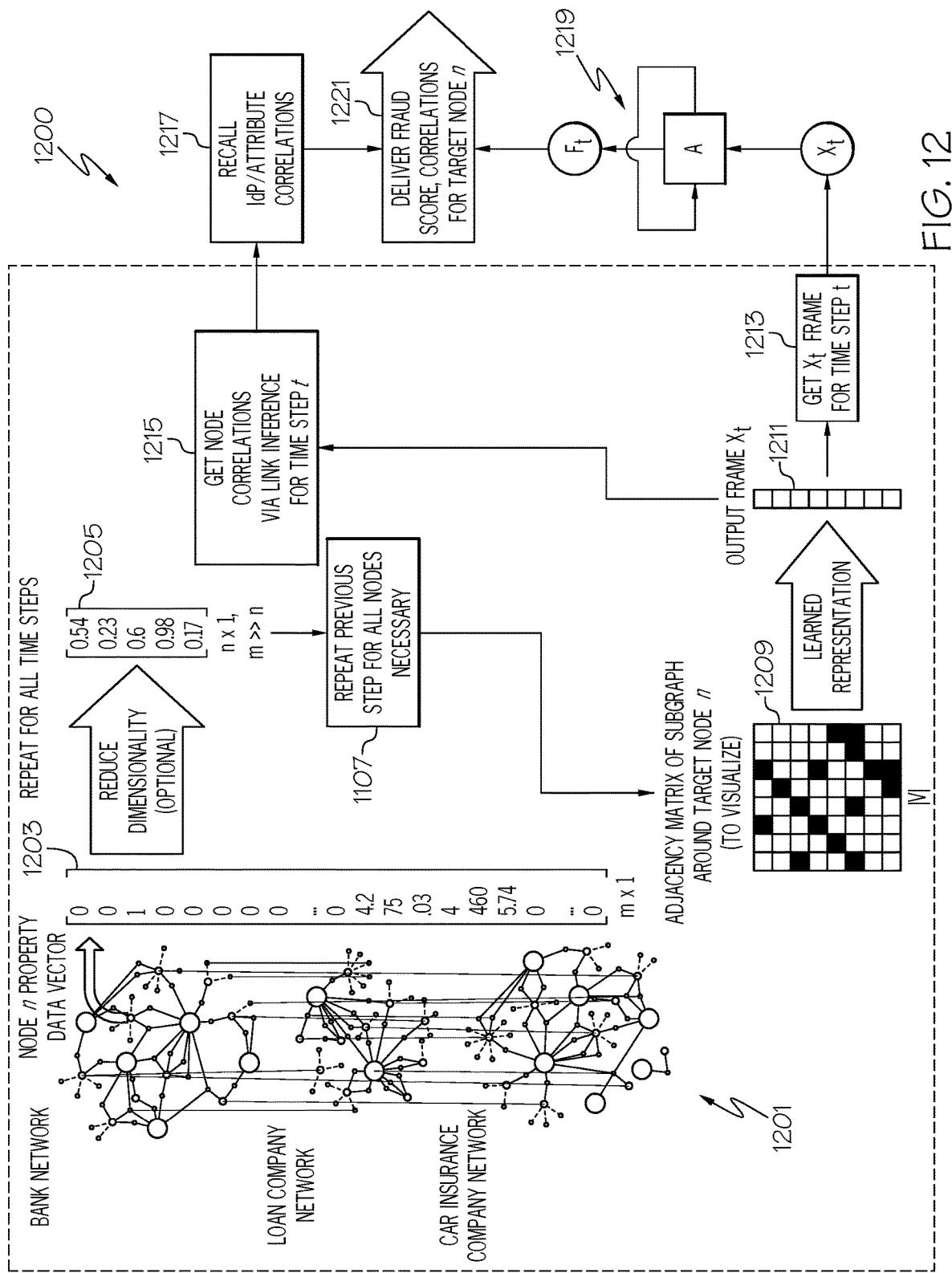
FIG. 12 depicts a high-level overview of a sequential embodiment of the present invention.

With reference now to FIG. 12, an exemplary temporal behavior fraud model 1200 as used in one or more embodiments of the present invention is presented.

Disparate networks 1201 (analogous to identity network 202 and identity network 208 shown in FIG. 2) generate data vectors from the values of their identity graphs, in order to populate a vector 1203. This vector 1203 is reduced into a manageably sized reduced vector 1205, which is repeated (step 1207) until all (or a predefined number) of the nodes in the graphs in the disparate networks 1201 are polled for their values. The reduced vector 1205 is then used to create a matrix subgraph 1209, which is used to create an output frame 1211 (e.g., a hashed version of the rows in the matrix subgraph 1209). As shown in block 1213, the output frame 1211 is sent out as a frame at a current time step t, which is used as an input to an accumulator A and analysis function Ft (element 1219), which sends its output to a final fraud score output 1221. Also input to the fraud score output 1221 are identity profile/attribute correlations 1217, which are based on the output of node correlations shown in block 1215.

Figure 13:
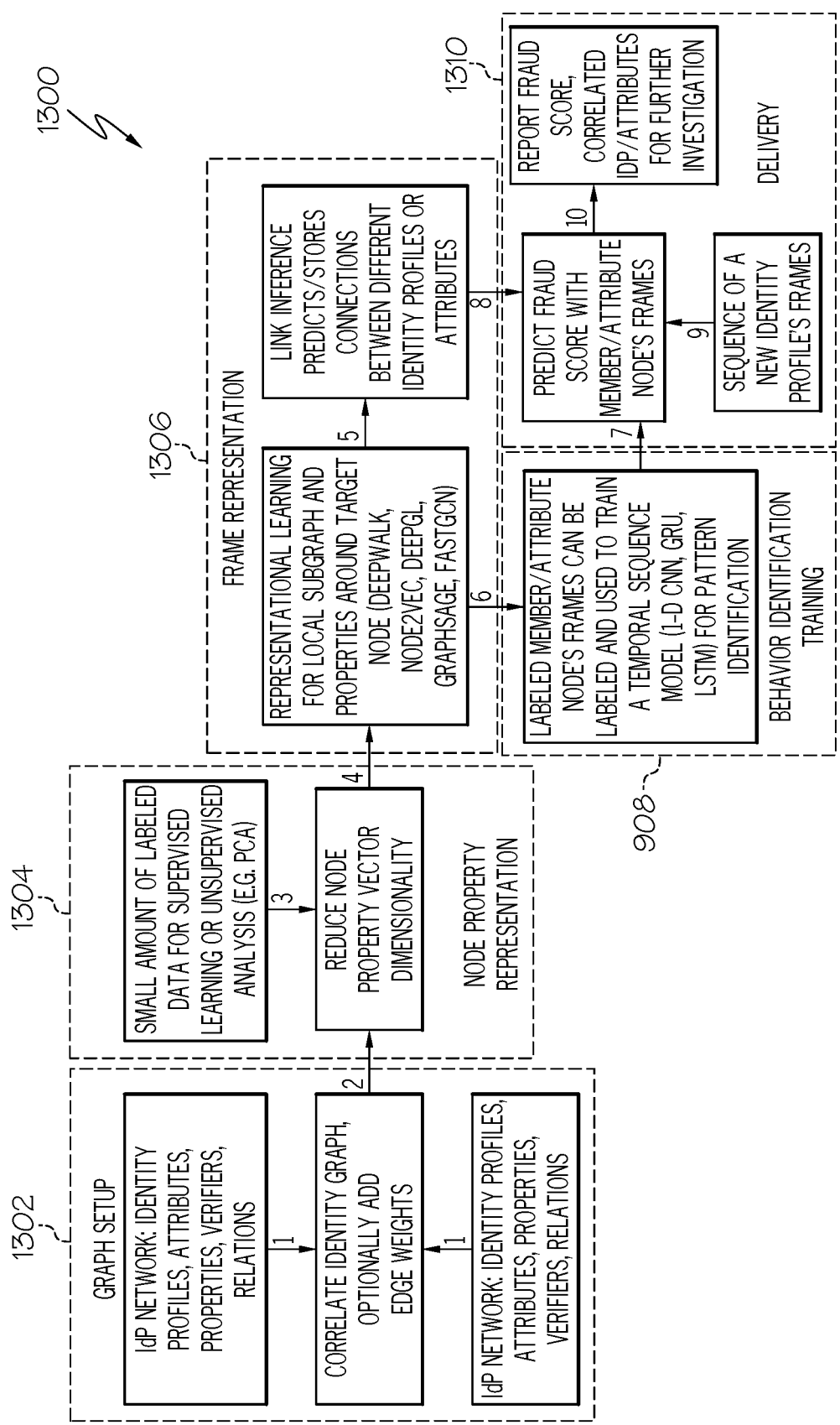
FIG. 13 illustrates a high-level overview of one or more embodiments of the present invention.

With reference to FIG. 13, another overview 1300 of one or more embodiments of the present invention is presented.

That is, one or more embodiments of the present invention includes (logic for) a graph setup 1302, a node property representation 1304, a frame representation 1306, behavior identification training 1308, and an identity and/or fraud score delivery 1310.

As shown in step 1, attribute types, identity profiles, verifiers, properties, and edges are correlated into an identity graph, in which identity profiles are linked together/correlated by an identity broker, self-reporting, ID matching, inference, etc. in the graph setup 1302.

As shown in step 2, the system parses node definitions, property vectors, and edges, and sends them to the node property representation 1304, which also incorporates labels for the nodes in the graphs, as shown in step 3.

As shown in step 4, the node property representation 1304 provides a dense node definition and property vectors to the frame representation 1306, which (in step 5) generates a correlated identity graph with identical structure but lower-dimensional node representations.

As shown in step 6, the frame representation 1306 sends member or attribute node "frames" (latent representations of local topology and properties) to the behavior identification training 1308, which outputs (step 7) sequence model weights used to predict fraud scores (also using the mapping of (associating/correlating) highly similar profiles for correlation shown in step 8), as well as a sequence of member or attribute frames (step 9), as shown in the identity and/or fraud score delivery 1310. As shown in step 10, a final fraud score, with linked identity profiles is then output to a requester of an identity for a particular person.

Figure 14:
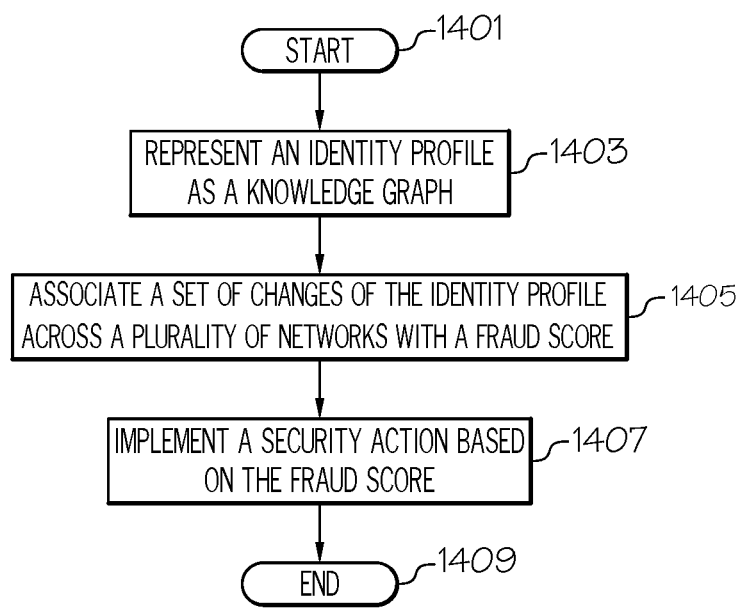
FIG. 14 is a high-level flow chart of one or more steps performed in accordance with one or more embodiments of the present invention.

With reference now to FIG. 14, a high-level flow chart of one or more elements of an exemplary method performed by the present invention is presented.

After initiator block 1401, one or more processors (e.g., within identity broker 218 shown in FIG. 2) represent an identity profile as a knowledge graph, as described in block 1403 (see also FIGS. 3A-9).

Figure 7A:
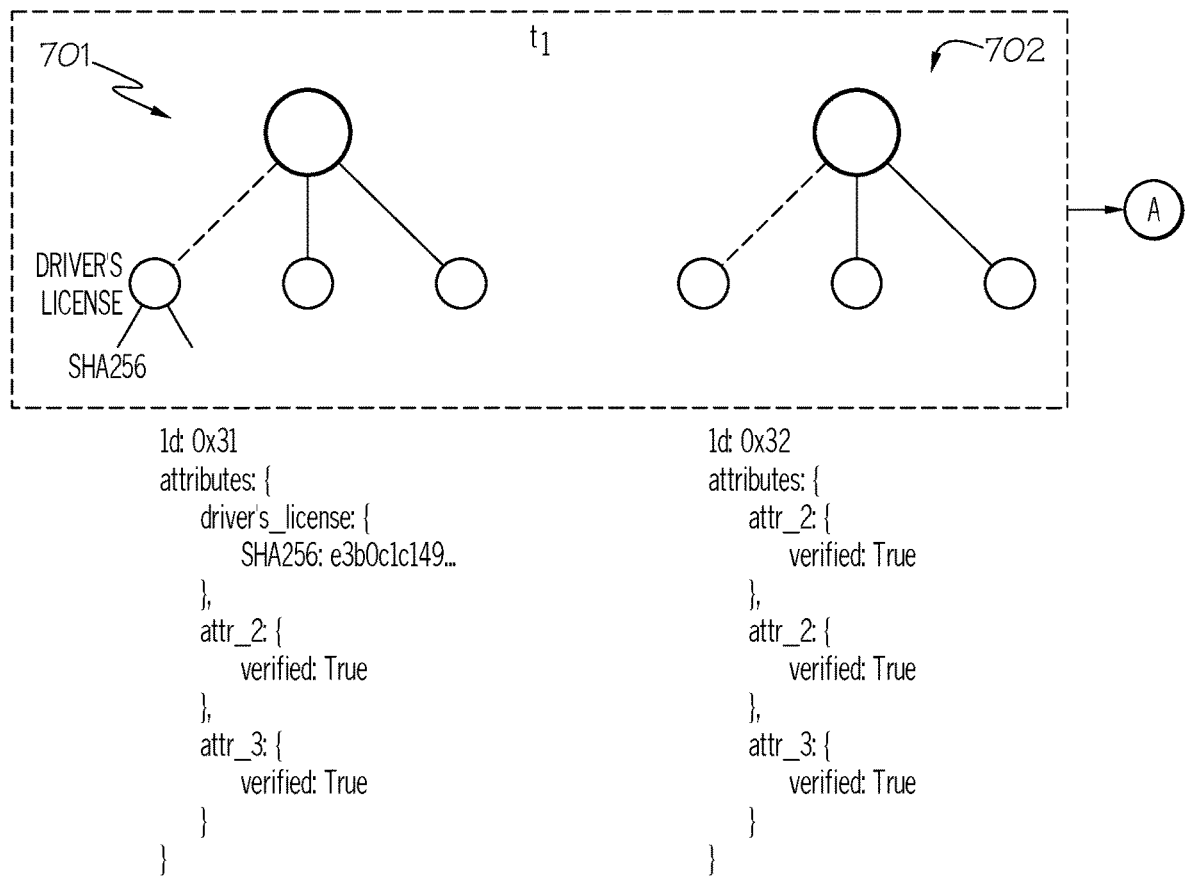
FIGS. 7A-7E illustrates fraudulent identities indicated by common ownership of an attribute by different entities, attributes changing multiple times, and/or statistical anomalies to attributes in accordance with one or more embodiments of the present invention.
Figure 7B:
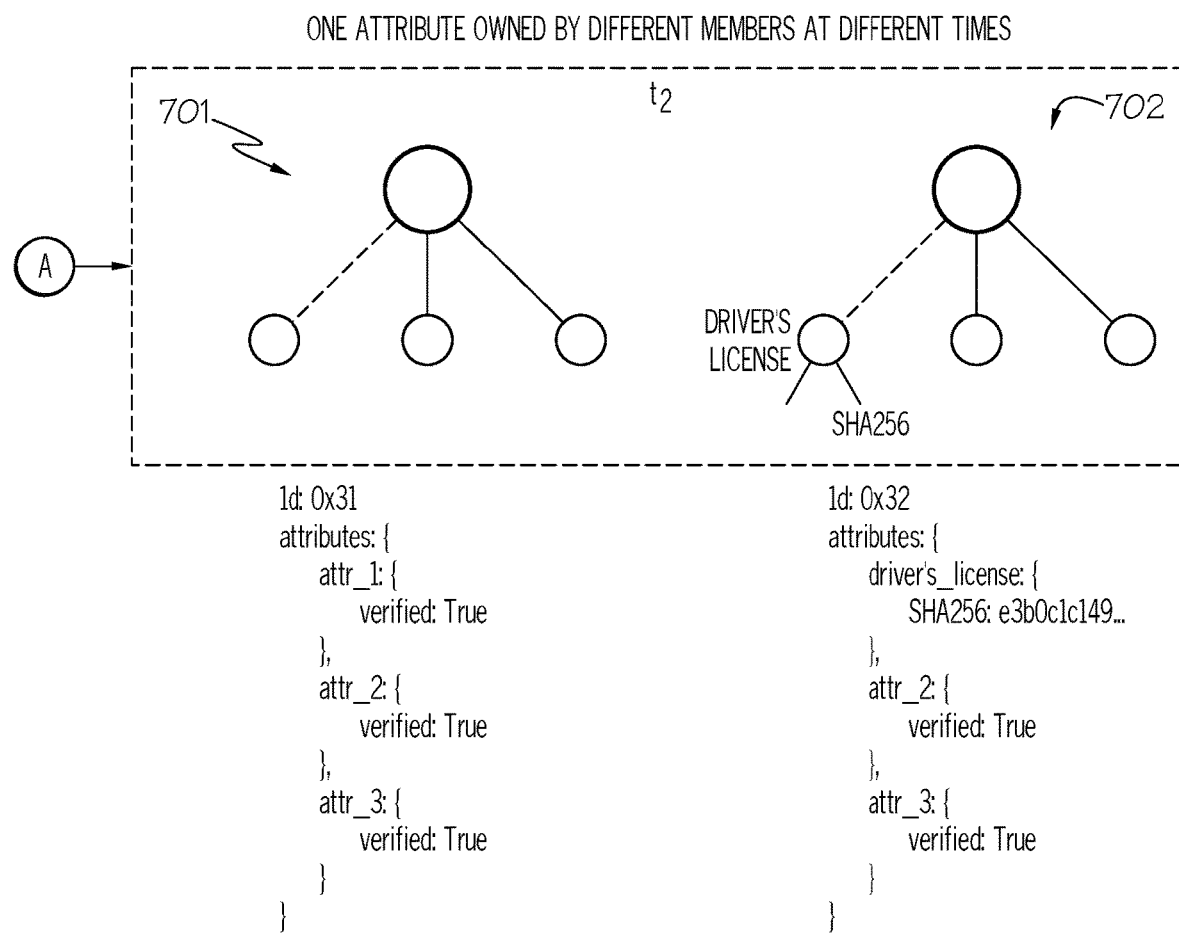
Figure 7C:
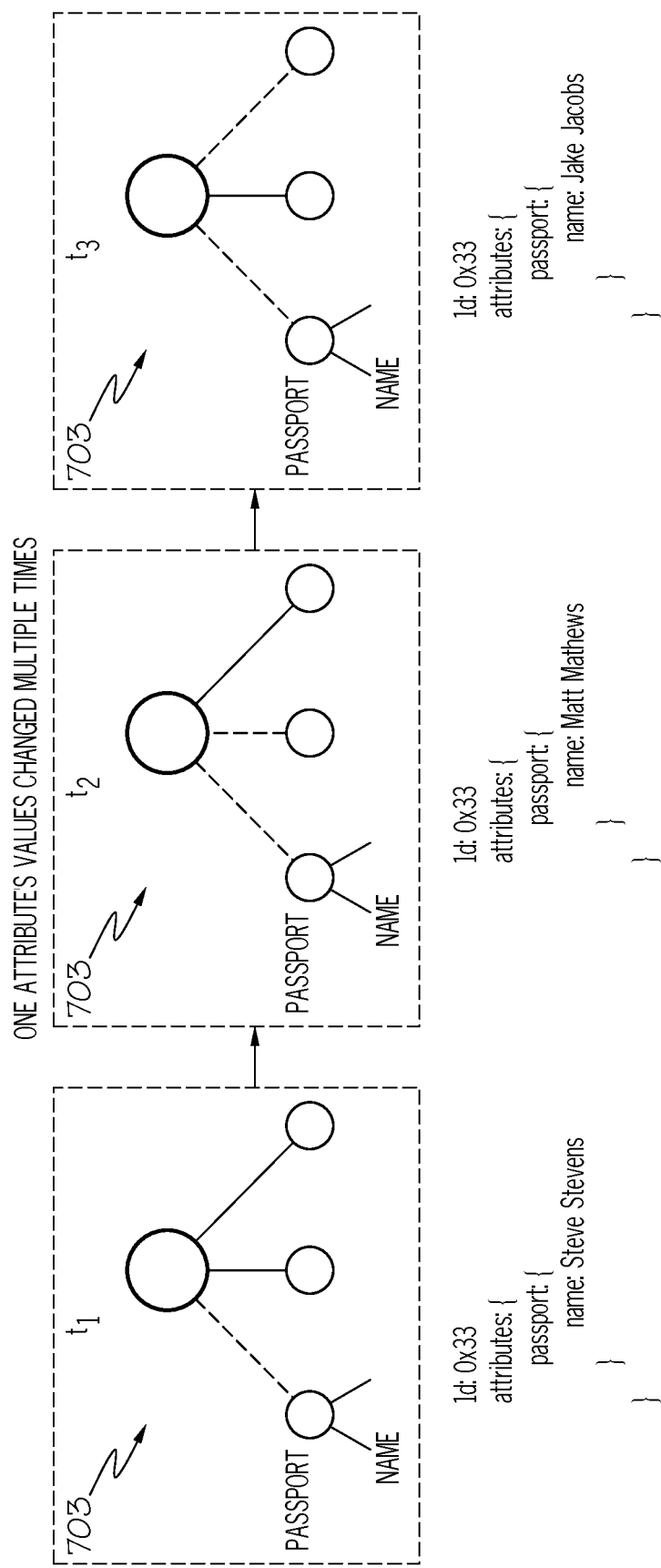
Figure 7D:
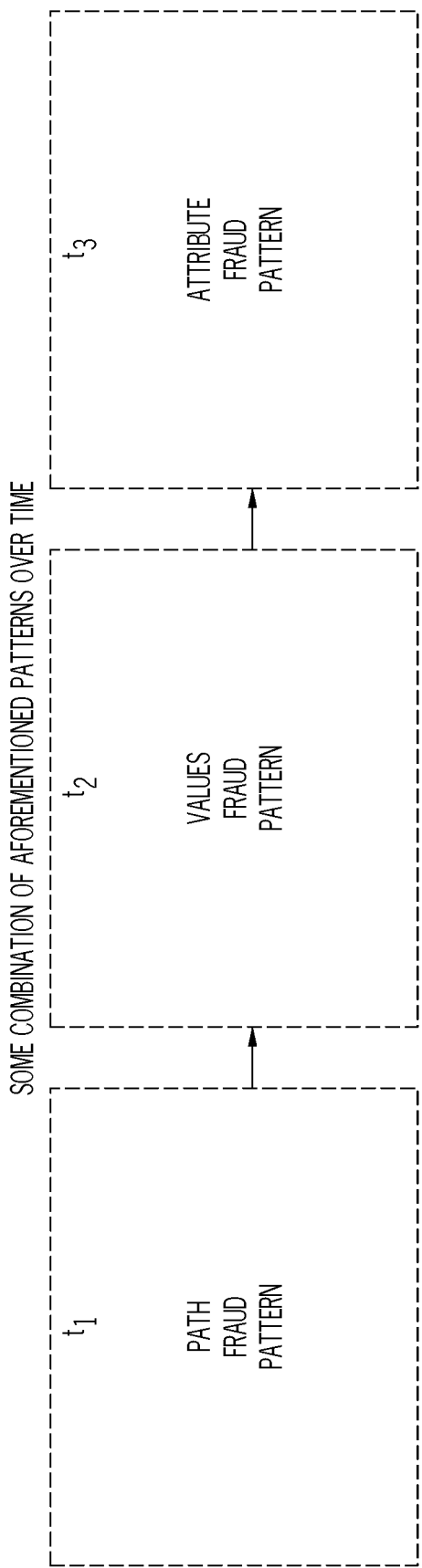
Figure 7E:
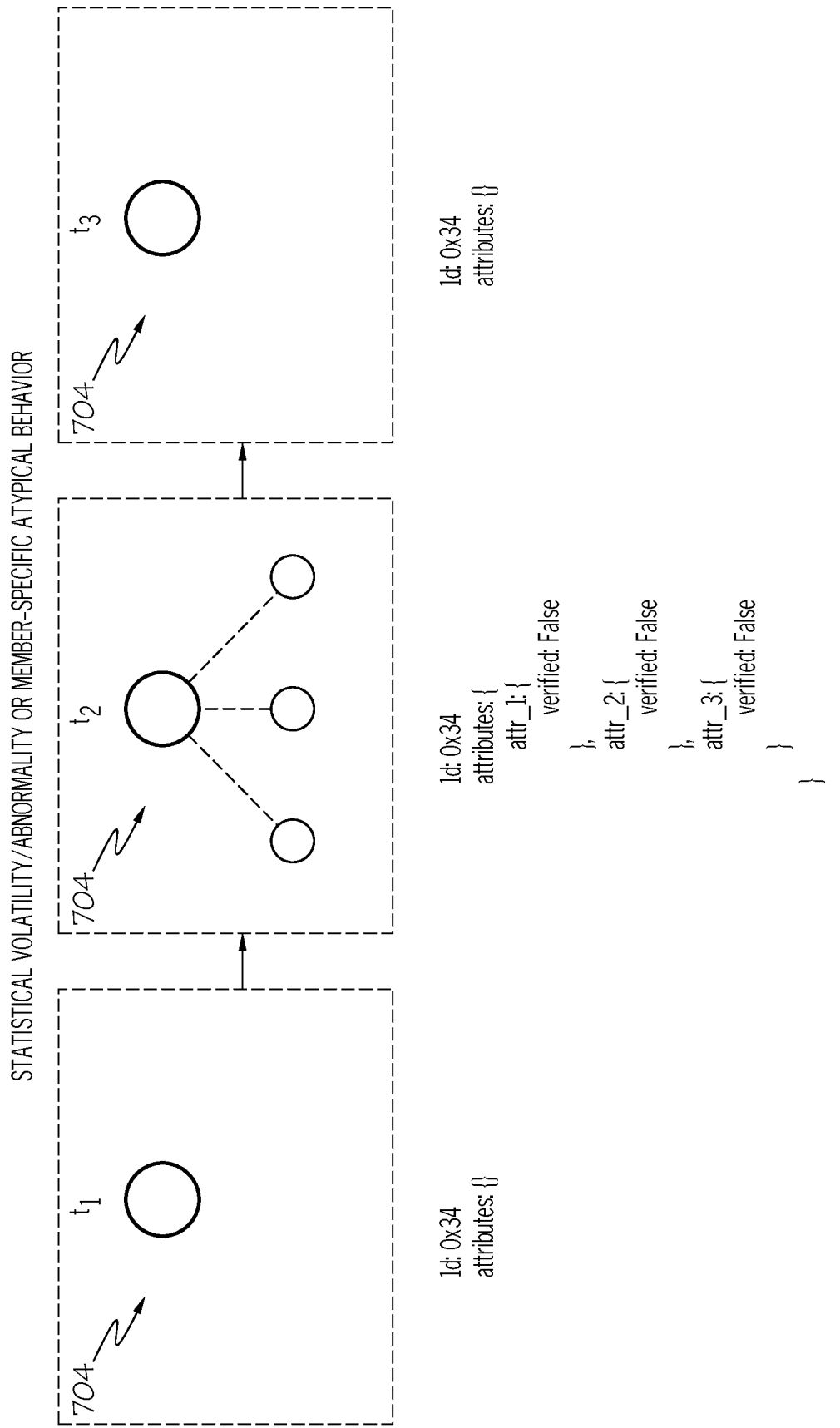

As described in block 1405, the processor(s) map/associate/correlate a set of changes of the identity profile to a fraud score. That is, if the identity profiles in different identity networks for a same entity have disparate values over a period of time, then their fraud score is raised. For example, as shown in FIG. 7C, identity profile graph 703 for a particular entity has changed over times $t_1$-$t_3$ in a suspicious manner. That is, if the identity profile graph 703 is for a same person over times $t_1$-$t_3$, but an attribute (e.g., a name on that same person's passport, multiple addresses over time, multiple identities on a same or different social media platform at the same time or at different times, etc.), which should remain somewhat constant, repeatedly changes over times $t_1$-$t_3$, then the identity profile graph 703 is likely fraudulent. Thus, these changes to the identity profile graph 703 are associated with (mapped to; correlated to) a higher fraud score. However if there were few, if any, changes in the set of changes, then the fraud score will be lower.

As such, a particular pattern of changes of the identity profile across the plurality of identity networks is indicative of fraud. Thus, in an embodiment of the present invention, the system compares a pattern of changes to the identity profile for a particular entity/person, and compares this pattern of changes (for the current identity profile) to a known pattern of changes that occur when there is a known fraudulent identity profile. If the pattern of changes between the current identity profile and the known fraudulent identity profile matches within a predetermined level (e.g., more than a predefined quantity or percentage of profile attributes change during a same length of time), then the current identity profile is deemed to also be fraudulent.

As described in block 1407, the processor(s) then implement a security action based on the fraud score (e.g., the fraud score exceeds some predefined value). Examples of such a security action include, but are not limited to, blocking a release of the identity profile to a requester of the identity profile (e.g., identity requester 220 shown in FIG. 2), issuing an alert to the identity requester, and/or modifying information in the identity profile.

In the embodiment of the present invention in which the security action is blocking the release of the identity profile to the identity requester, the identity broker will simply fail to return the identity profile to the identity requester.

In the embodiment of the present invention in which the security action is issuing an alert, the identity broker will explain that the retrieved identity profiles are untrustworthy, and/or will provide an explanation to the identity requester as to why the retrieved identity profiles are untrustworthy (e.g., identity attributes are changing excessively over time, identity attributes for identity profiles in disparate identity networks are excessively different, etc.).

In the embodiment of the present invention in which the security action is modifying information in the identity profile, assume that the attributes/labels/values in an identity profile (in a first identity network) of a particular person is confirmed to be accurate, but the identity profile for this same person is deemed to be inaccurate, then the attributes/labels/values in the identity profile in the second network for this same person are modified to match the identity profile for that person in the second identity network.

In an embodiment of the present invention, if the fraud score for the identity profile is below the predefined value, then no security action is taken.

In an embodiment of the present invention, the security action is performed by the identity broker 218, such that the identity requester 220 is never presented with an identity profile that the identity requester 220 mistakes for a valid identity profile.

In another embodiment of the present invention, the security action is performed by the identity requester 220, thus giving the identity requester 220 the option of whether to perform one or more security actions regarding the fraudulent identity profile.

The flow chart ends at terminator block 1409.

As depicted in FIGS. 8-9, in an embodiment of the present invention the knowledge graph is a graph neural network.

As depicted in FIGS. 8-9, in which each node in the knowledge graph is represented as a node vector, an embodiment of the present invention represents a neighborhood of each node as a neighborhood vector, wherein changes to the identity profile are determined by detecting changes in the neighborhood vector over time; and determines that the identity profile is fraudulent based on the changes in the neighborhood vector over time. (See FIGS. 7A-7E.)

In an embodiment of the present invention, if two child nodes are for a same attribute of a parent node, then these child nodes are likely not valid. (See FIGS. 5A-5C.) Thus, in an embodiment of the present invention, the processor(s) calculate a similarity score for multiple nodes in the knowledge graph. The processor(s) then determine a correlation between two nodes in the knowledge graph as having a same similarity score, and then determine that the identity profile is fraudulent based on the two nodes in the knowledge graph having the same similarity score.

In an embodiment of the present invention, the processor(s) aggregate the fraud score, the similarity score, and a base score for each node; and then determine that the identity profile is fraudulent based on an aggregation of the fraud score, the similarity score, and the base score for each node. That is, the fraud score is derived based on the node values, attribute nodes, edges, paths, and temporal behaviors (see FIGS. 3A-7E). The similarity score is based on similarities of attribute nodes (i.e., child nodes of a parent node), as discussed in identity profile graph 504 and identity profile graph 505 of FIG. 5C. The base score is based on an inherent fraud rating, such as that provided by an identity network that provides the node, showing that the node in fact is provided by the identity network using information that is initially trusted by that identity network. (See verifier node 830 in FIG. 8.) Thus, an aggregation (e.g., a mathematical summation, average, etc.) of these scores is used to determine whether the identity profile is fraudulent or not.

In an embodiment of the present invention, if the fraud score for the identity profile exceeds a predefined value, then the system (e.g., the identity broker 218 shown in FIG. 2) blocks a release of the identity profile to a requester (e.g., identity requester 220) of the identity profile.

As described herein, values used to predict fraudulent identities include, but are not limited to, customized classifiers created by neural networks and/or dimensionality reducers (e.g., autoencoders) for preprocessing; statistical or logical models for hand-engineered criteria (red flag features); inductive representation learning for node embedding on attributed graph; and/or classification models trained on embeddings and red flag labels.

Attributes of graph nodes are identified in various embodiments of the present invention using random walk algorithms/etc. for embedding graph nodes; statistical or logical model for hand-engineered criteria; and/or classification models trained on embeddings and red flag labels.

Edges are defined using random walk algorithms/etc. for embedding graph nodes; statistical or logical models for hand-engineered criteria (red flag features); and/or similarity models for edge inference.

Paths taken through a graph are identified using random walk algorithms/etc. for embedding graph nodes; statistical or logical model for hand-engineered criteria (for source nodes as well); classification model trained on embeddings and red flag labels; and/or numerical model for visualizing or tagging fraud paths.

Temporal behaviors of nodes in an identity graph are identified using customized classifiers/dimensionality reducers for preprocessing if attributed; statistical or logical model for hand-engineered criteria (red flag features); inductive representation learning for node embedding on attributed or non-attributed graph; a repetition of steps described above to create a temporal sequence of embeddings; and/or a sequence model for classifying sequences of embeddings.

As described herein, one or more embodiments of the present invention uses machine learning to formulate an approach to combat fraud in decentralized identity profiles. Such identity profiles (people) are represented as attributed subgraphs—structures that link together different attributes, from often disjointed identity networks (e.g., from banks, insurance companies, government agencies, etc.).

Thus, as described herein, one or more embodiments of the present invention use neural networks (graph neural networks, deep neural networks, etc.) to embed, or represent, the identity profile or attribute of interest and its interactions with other objects in the graph at a given time. One or more embodiments of the present invention also correlates/associates changes and interactions over time, or behaviors, of the identity profile or attribute of interest, to a fraud score.

As such, the present invention has the capability to actionably use any data or heuristics a client or network can provide with different deep learning techniques and analytics, and is useful even only if minimal data like a graph structure is available, using behaviors and relationships between multiple identity networks to perform strong inference on identity profiles. The system yields several deliverables that a client can use in their fraud detection stack, depending on the data the client has.

In an embodiment of the present invention, an identity broker provides a mechanism to connect with many identity networks and facilitates cross-network fraud scoring. The broker also provides an option to display fraud scores associated with identity profiles in one or more identity networks. (See FIG. 2.)

The present invention therefore provides an analysis of relationships and behavioral patterns within and between multiple identity networks for predictive fraud analysis. One or more embodiments of the present invention use a unifying agent (e.g., identity broker 218 shown in FIG. 2) for cross-network data share, such that cross-network graph analysis is enabled in order to detect fraud across the various identity networks and to infer connections between reportedly unlinked identity profiles.

One or more embodiments of the present invention use graph neural networks and supervised temporal learning for dynamic fraud pattern discovery. As described herein, neural networks identify behaviors in graph topology over time that are suspicious. Based on training data, the system is able to 1) identify fraudulent members; 2) identify fraudulent attributes; 3) identify "data furnishers" (verifiers linked with fraudulent activity, using node degree thresholds); and 4) identify "pollinators" (non-fraudulent people linked with fraudulent activity, using node degree thresholds).

As described herein and in one or more embodiments of the present invention, an identity graph (as used in a graph neural network) is a set of member nodes (people), attribute nodes (address, social security number, etc.), verifier nodes (insurance companies, credit agencies, government agencies, universities, etc.), and the edges connecting verifiers and attributes/attributes and members. With regard to a verifier node, return now to FIG. 8. Assume that node 804 is for a particular person.

Generating an accurate fraud score requires looking at different properties of an attribute or member and the ways they behave over time.

To represent these properties, an algorithm reduces the dimensionality of a sparse, high-dimensional vector defining a node. Once this vector is of a manageable size, the graph model explores features of a node's local neighborhood and represent this data in a new vector, which is called a frame. A frame represents important data about the vector and its neighborhood. A frame is generated for each time step available in the identity networks. Using a learning sequence model, the system is able to determine a fraud score based on a node's behavior and properties as they change over time.

Thus, in order to set up a graph (e.g., one or more of the graphs depicted in FIGS. 3A-9), all nodes are assigned a class based on the network from which they come. These nodes are aggregated/merged into correlated identity profile vertices, in order to create vectors for vertex property representation.

The use of such a structured graph is then used to identify fraudulent behaviors indicated in labeled sequences of frames.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 15:
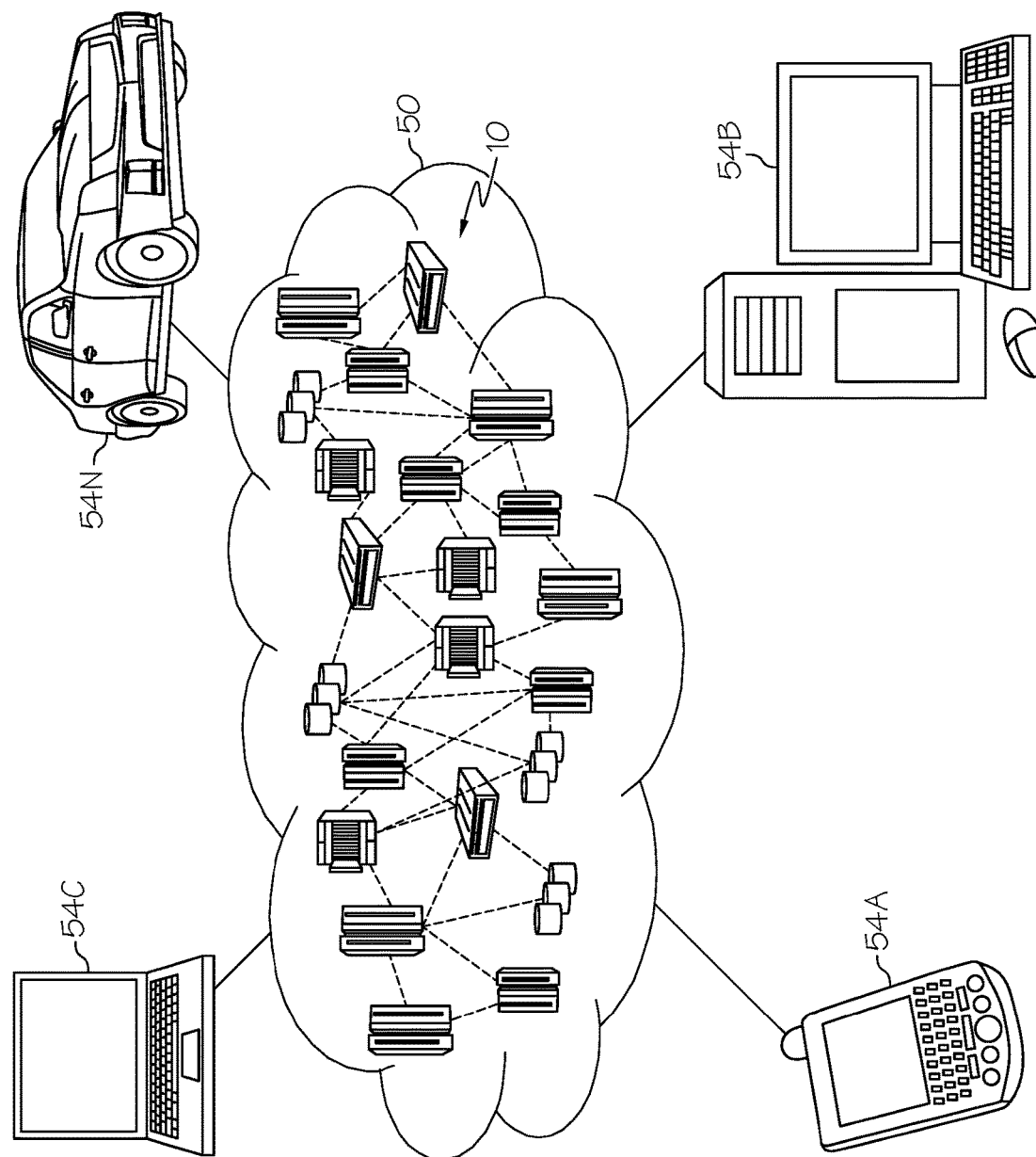
FIG. 15 depicts a cloud computing environment according to an embodiment of the present invention.

Referring now to FIG. 15, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 15 are intended to be illustrative only and that computing nodes 10 and cloud computing environment 50 can communicate with any type of computerized device over any type of network and/or network addressable connection (e.g., using a web browser).

Figure 16:
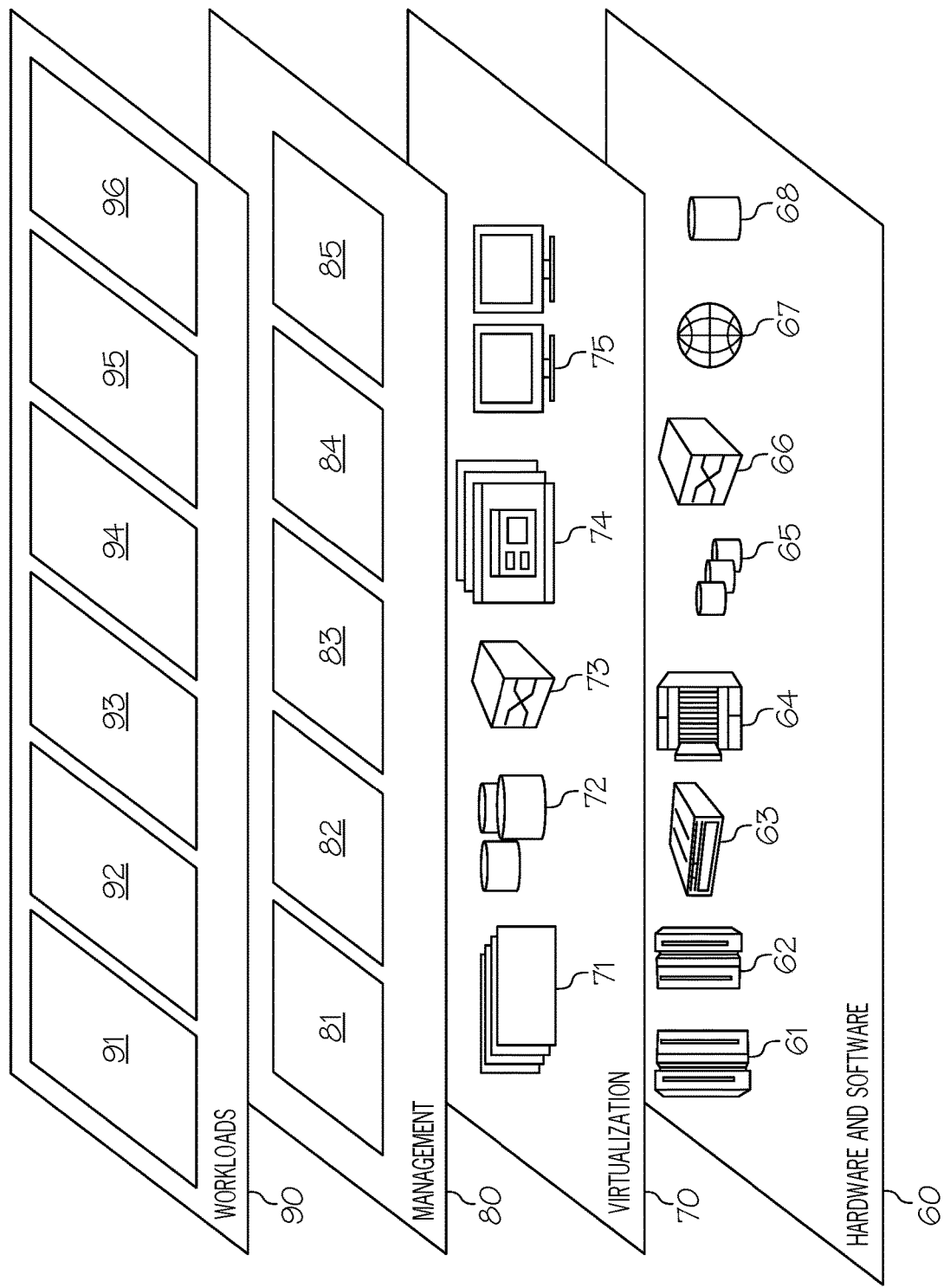
FIG. 16 depicts abstraction model layers of a cloud computer environment according to an embodiment of the present invention.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and machine learning and identity fraud detection processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   representing, by an identity broker, an identity profile as a knowledge graph, wherein the identity broker receives a request for the identity profile from an identity requester, wherein the request is fulfilled by the identity broker from identity profiles from a plurality of identity networks, and wherein the identity broker couples an identity requester computer to the plurality of identity networks;
   associating, by the identity broker, a set of changes of the identity profile across the plurality of identity networks with a fraud score, wherein the fraud score identifies the identity profile located in the plurality of identity networks as being fraudulent; and implementing, by the identity broker, a security action based on the fraud score exceeding a predefined value, wherein the security action implemented by the identity broker blocks a release of the identity profile from the plurality of identity networks to the identity requester that requested the identity profile.

2. The method of claim 1, wherein the knowledge graph is a graph neural network, wherein the graph neural network comprises multiple nodes that describe features of the identity profile, wherein pairs of nodes in the graph neural network are linked by an edge that describes a logical relationship between a pair of nodes, and wherein the method further comprises:

training a deep neural network to define the edge that describes the logical relationship between the pair of nodes.

3. The method of claim 1, wherein each node in the knowledge graph is represented as a node vector, and wherein the method further comprises:

representing, by one or more processors, a neighborhood of said each node in the knowledge graph as a neighborhood vector, wherein changes to the identity profile are determined by detecting changes in the neighborhood vector over time; and determining, by one or more processors, that the identity profile is fraudulent based on the changes in the neighborhood vector over time.

4. The method of claim 1, further comprising:

calculating, by one or more processors, a similarity score for multiple nodes in the knowledge graph;

determining, by one or more processors, a correlation between two nodes in the knowledge graph as having a same similarity score; and determining, by one or more processors, that the identity profile is fraudulent based on the two nodes in the knowledge graph having the same similarity score.

5. The method of claim 4, further comprising:

aggregating, by one or more processors, the fraud score, the similarity score, and a base score for each node, wherein the fraud score is based on node values, attribute nodes, edges, paths, and temporal behaviors of nodes in the knowledge graph, wherein the similarity score is based on similarities of child nodes of a parent node in the knowledge graph, and wherein the base score is based on an inherent fraud rating that is provided by an identity network that provides the node using information that was initially trusted by that identity network; and further determining, by one or more processors, that the identity profile is fraudulent based on an aggregation of the fraud score, the similarity score, and the base score for each node.

6. The method of claim 1, wherein the identity profile is depicted as a node in the knowledge graph, wherein the node is identified by a name of a person, wherein a first time is before a second time, wherein the second time is before a third time, and wherein the method further comprises:

determining, by one or more processors, that the node has no attributes at the first time;

determining, by one or more processors, that the node has multiple unverified attributes at the second time;

determining, by one or more processors, that the node has no attributes at the third time; and in response to determining that the node has no attributes at the first time, that the node has multiple unverified attributes at the second time, and that the node has no attributes at the third time, identifying, by one or more processors, the identity profile depicted as the node as being fraudulent.

7. A computer program product comprising a computer readable storage medium having program code embodied therewith, wherein the computer readable storage medium is not a transitory signal per se, and wherein the program code is readable and executable by a processor to perform a method comprising:

representing, by an identity broker, an identity profile as a knowledge graph, wherein the identity broker receives a request for the identity profile from an identity requester, wherein the request is fulfilled by the identity broker from identity profiles from a plurality of identity networks, and wherein the identity broker couples an identity requester computer to the plurality of identity networks;

associating, by the identity broker, a set of changes of the identity profile across the plurality of identity networks with a fraud score, wherein the fraud score identifies the identity profile located in the plurality of identity networks as being fraudulent; and implementing, by the identity broker, a security action based on the fraud score exceeding a predefined value, wherein the security action implemented by the identity broker blocks a release of the identity profile from the plurality of identity networks to the identity requester that requested the identity profile.

8. The computer program product of claim 7, wherein the knowledge graph is a graph neural network, wherein the graph neural network comprises multiple nodes that describe features of the identity profile, wherein pairs of nodes in the graph neural network are linked by an edge that describes a logical relationship between a pair of nodes, and wherein the method further comprises:

training a deep neural network to define the edge that describes the logical relationship between the pair of nodes.

9. The computer program product of claim 7, wherein each node in the knowledge graph is represented as a node vector, and wherein the method further comprises:

representing a neighborhood of said each node in the knowledge graph as a neighborhood vector, wherein changes to the identity profile are determined by detecting changes in the neighborhood vector over time; and determining that the identity profile is fraudulent based on the changes in the neighborhood vector over time.

10. The computer program product of claim 7, wherein the method further comprises:

calculating a similarity score for multiple nodes in the knowledge graph;

determining a correlation between two nodes in the knowledge graph as having a same similarity score; and determining that the identity profile is fraudulent based on the two nodes in the knowledge graph having the same similarity score.

11. The computer program product of claim 10, wherein the method further comprises:

aggregating the fraud score, the similarity score, and a base score for each node, wherein the fraud score is based on node values, attribute nodes, edges, paths, and temporal behaviors of nodes in the knowledge graph, wherein the similarity score is based on similarities of child nodes of a parent node in the knowledge graph, and wherein the base score is based on an inherent fraud rating that is provided by an identity network that provides the node using information that was initially trusted by that identity network; and further determining that the identity profile is fraudulent based on an aggregation of the fraud score, the similarity score, and the base score for each node.

12. The computer program product of claim 7, wherein the identity profile is depicted as a node in the knowledge graph, wherein the node is identified by a name of a person, wherein a first time is before a second time, wherein the second time is before a third time, and wherein the method further comprises:

determining that the node has no attributes at the first time;

determining that the node has multiple unverified attributes at the second time;

determining that the node has no attributes at the third time; and in response to determining that the node has no attributes at the first time, that the node has multiple unverified attributes at the second time, and that the node has no attributes at the third time, identifying the identity profile depicted as the node as being fraudulent.

13. The computer program product of claim 7, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

representing, by an identity broker, an identity profile as a knowledge graph, wherein the identity broker receives a request for the identity profile from an identity requester, wherein the request is fulfilled by the identity broker from identity profiles from a plurality of identity networks, and wherein the identity broker couples an identity requester computer to the plurality of identity networks;

associating, by the identity broker, a set of changes of the identity profile across the plurality of identity networks with a fraud score, wherein the fraud score identifies the identity profile located in the plurality of identity networks as being fraudulent; and implementing, by the identity broker, a security action based on the fraud score exceeding a predefined value, wherein the security action implemented by the identity broker blocks a release of the identity profile from the plurality of identity networks to the identity requester that requested the identity profile.

15. The computer system of claim 14, wherein the knowledge graph is a graph neural network, wherein the graph neural network comprises multiple nodes that describe features of the identity profile, wherein pairs of nodes in the graph neural network are linked by an edge that describes a logical relationship between a pair of nodes, and wherein the method further comprises:

training a deep neural network to define the edge that describes the logical relationship between the pair of nodes.

16. The computer system of claim 14, wherein each node in the knowledge graph is represented as a node vector, and wherein the method further comprises:

representing a neighborhood of said each node in the knowledge graph as a neighborhood vector, wherein changes to the identity profile are determined by detecting changes in the neighborhood vector over time; and determining that the identity profile is fraudulent based on the changes in the neighborhood vector over time.

17. The computer system of claim 14, wherein the method further comprises:

calculating a similarity score for multiple nodes in the knowledge graph;

determining a correlation between two nodes in the knowledge graph as having a same similarity score; and determining that the identity profile is fraudulent based on the two nodes in the knowledge graph having the same similarity score.

18. The computer system of claim 17, wherein the method further comprises:

aggregating the fraud score, the similarity score, and a base score for each node, wherein the fraud score is based on node values, attribute nodes, edges, paths, and temporal behaviors of nodes in the knowledge graph, wherein the similarity score is based on similarities of child nodes of a parent node in the knowledge graph, and wherein the base score is based on an inherent fraud rating that is provided by an identity network that provides the node using information that was initially trusted by that identity network; and further determining that the identity profile is fraudulent based on an aggregation of the fraud score, the similarity score, and the base score for each node.

19. The computer system of claim 14, wherein the identity profile is depicted as a node in the knowledge graph, wherein the node is identified by a name of a person, wherein a first time is before a second time, wherein the second time is before a third time, and wherein the method further comprises:

determining that the node has no attributes at the first time;

determining that the node has multiple unverified attributes at the second time;

determining that the node has no attributes at the third time; and in response to determining that the node has no attributes at the first time, that the node has multiple unverified attributes at the second time, and that the node has no attributes at the third time, identifying the identity profile depicted as the node as being fraudulent.

20. The computer system of claim 14, wherein the stored program instructions are provided as a service in a cloud environment.

* * * * *